United States Patent
Macauley et al.

(10) Patent No.: US 9,602,679 B2
(45) Date of Patent: Mar. 21, 2017

(54) DISTRIBUTED PRINTING SOCIAL NETWORK

(71) Applicants: Robert M. Macauley, Venice, CA (US); Timothy S. Martin, El Dorado Hills, CA (US); Guy C. Vachon, Aptos, CA (US); Patrick A. Cosgrove, Honeoye Falls, NY (US); Steven J. Sasson, Hilton, NY (US); Eric D. Wilson, West Sacramento, CA (US)

(72) Inventors: Robert M. Macauley, Venice, CA (US); Timothy S. Martin, El Dorado Hills, CA (US); Guy C. Vachon, Aptos, CA (US); Patrick A. Cosgrove, Honeoye Falls, NY (US); Steven J. Sasson, Hilton, NY (US); Eric D. Wilson, West Sacramento, CA (US)

(73) Assignee: LifePrint LLC, El Dorado Hills, CA (US)

( * ) Notice: Subject to any disclaimer, the term of this patent is extended or adjusted under 35 U.S.C. 154(b) by 0 days.

(21) Appl. No.: 14/631,717

(22) Filed: Feb. 25, 2015

(65) Prior Publication Data

US 2015/0244878 A1    Aug. 27, 2015

Related U.S. Application Data

(60) Provisional application No. 61/945,278, filed on Feb. 27, 2014.

(51) Int. Cl.
*G06K 15/00* (2006.01)
*H04N 1/00* (2006.01)
*G06F 3/12* (2006.01)
*G06Q 50/00* (2012.01)
*G06Q 30/02* (2012.01)

(52) U.S. Cl.
CPC ....... *H04N 1/00188* (2013.01); *G06F 3/1204* (2013.01); *G06F 3/126* (2013.01); *G06F 3/1288* (2013.01); *G06F 3/1292* (2013.01); *G06Q 30/0207* (2013.01); *G06Q 50/01* (2013.01); *H04N 1/00145* (2013.01); *H04N 1/00159* (2013.01); *H04N 1/00177* (2013.01); *H04N 1/00201* (2013.01)

(58) Field of Classification Search
USPC .. 358/468, 1.15, 2.1, 1.9, 1.2, 500, 438, 439
See application file for complete search history.

(56) References Cited

U.S. PATENT DOCUMENTS

| | | | |
|---|---|---|---|
| 2010/0325154 A1* | 12/2010 | Schloter | G06F 17/30265 707/770 |
| 2012/0188382 A1* | 7/2012 | Morrison | G06F 17/30265 348/207.1 |
| 2015/0103188 A1* | 4/2015 | Lin | H04N 1/00209 348/207.11 |
| 2015/0221048 A1* | 8/2015 | Zenhausern | G06Q 50/14 705/26.5 |
| 2015/0254886 A1* | 9/2015 | Li | G06T 11/60 345/473 |

* cited by examiner

*Primary Examiner* — Jerome Grant, II
(74) *Attorney, Agent, or Firm* — Mersenne Law

(57) ABSTRACT

A system for distributing data that represents and can be converted into a physical object such as a printed photograph or three-dimensional "3D printed" object provides a variety of user controls to direct the flow of data and restrict the use of consumable supplies.

33 Claims, 14 Drawing Sheets

Case #1

Case #2

Case #3

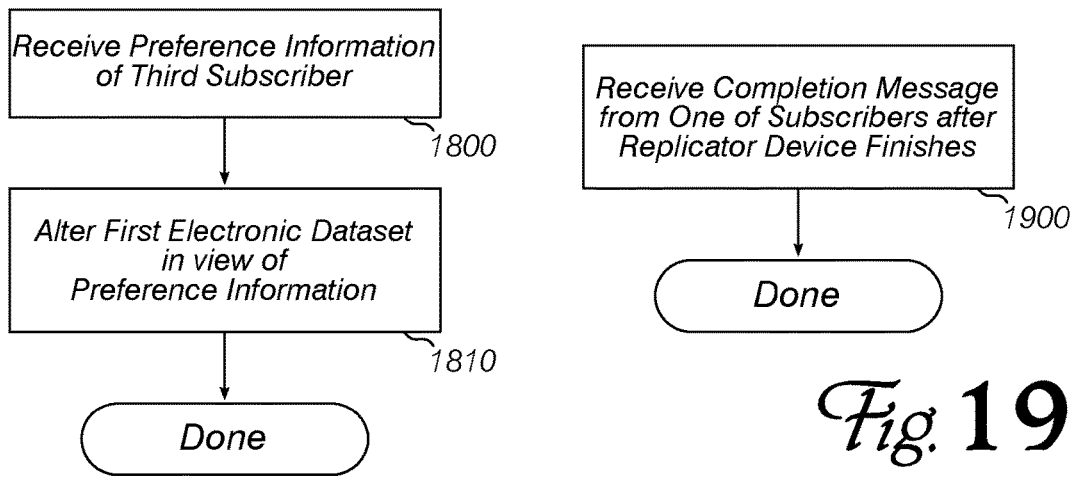
Fig. 18
Fig. 19
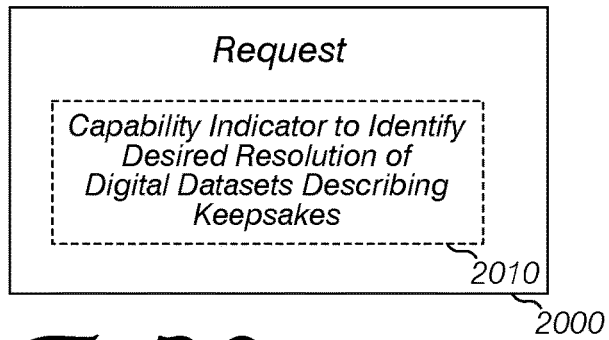
Fig. 20
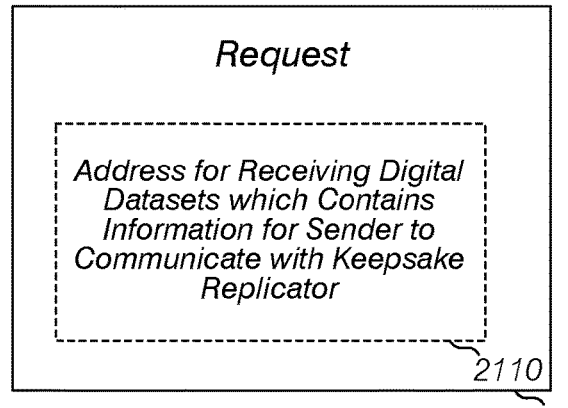
Fig. 21

DISTRIBUTED PRINTING SOCIAL NETWORK

CONTINUITY AND CLAIM OF PRIORITY

This is an original U.S. patent application that claims priority to U.S. provisional patent application No. 61/945,278 filed 27 Feb. 2014.

FIELD

The invention relates to methods and systems for processing, transmitting and rendering electronic data into a permanent physical object. More specifically, the invention relates to systems for constructing two- and/or three-dimensional physical artifacts from data acquired and transmitted through a network comprising nodes having predetermined social relationships.

BACKGROUND

Today, more photographs are taken than any time in history. With the advent of Smartphones, users have an increasingly capable camera platform which they carry with them everywhere they go. Photos are taken quickly and easily, and because Smartphones are connected to the internet via cellular or Wi-Fi technology, those images are shared with family and friends through a number of services. Images can be emailed, added to text messages, or shared via popular social media such as Facebook, Twitter and Instagram.

While more images are being captured than ever, fewer are being printed. There are many reasons for this. While it is easy to share images with family and friends via the internet, it is not always easy, straightforward, or convenient to get the images off of your phone and printed.

Home printers are typically complex multipurpose devices. In order to satisfy the largest number of possible user needs, printers today are festooned with multiple interfaces (USB, Bluetooth, Wi-Fi, Ethernet, etc.), and support a host of different standard protocols to maximize their compatibility with various applications. They are designed to use papers of various sizes and types, support one-sided or two-sided printing, and leverage multiple paper sources. In addition, there are many special software applications provided by printer manufacturers to enable a large variety of print applications. As a result of this, printers tend to be large complicated devices that stay one place in the home. They are difficult to setup and users tend to take advantage of only a small subset of their features. On top of this, the user must have a variety of consumables on hand to support different printing applications: different sizes and types of paper, collections of ink and toner cartridges, and so on.

Because of all of this complexity, many users just don't know how to print photos from their phones, or find the process so inconvenient, awkward or time consuming, that they seldom make the effort.

Another photographic concept that was common in the past was the idea of "instant printing". This involved the use of cameras with special print film that was designed to self-develop in seconds, directly providing a print. Polaroid was famous for its line of cameras that produced instant prints. There was something special and fun about the ability to produce an instant print from a moment that was captured. While photography is often used to record life events, the immediate gratification of the instant print often became the stimuli and focus of a social event. Friends involved in taking pictures of themselves and instantly looking at the results create enjoyable and fun moments that help to drive and enhance social interactions. Such prints were often given to individuals at the gathering as a keepsake of their fun moments together. These were real and lasting tokens of social exchange, not virtual ones.

While many older users have grown up in a time where hardcopy prints of your images was a common experience, the younger generation has grown up in a world where such prints are increasingly rare. The concept of an "instant print" is even rarer still, and something that is just not part of their common experience.

Instead, imaging experiences are typically based upon softcopy images viewed on their computer or their Smartphone and shared with family and friends via a collection of communication vehicles and social media sites. This in itself has created new forms of rich social sharing. Images, and the comments associated with them, have become the new tokens of social exchange and a core aspect of modern social media. Users can share moments of their day with a network of friends and have them respond to their images, and even share images of their own. This mechanism acts to nurture relationships in a way that was not possible in the days before the internet, when the only way to share images was through hardcopy prints.

While Social Media sharing is a positive experience for many people, at the end of the day, this sharing is ephemeral. Images are shared and forgotten. Screen images last for mere moments and then are gone. Sharing happens often, but ultimately is a fuzzy and intangible experience that is sometimes drowned out by the sheer volume of images being shared within larger social networks.

While the value of softcopy images as part of the social networking experience is significant, such softcopy images are less useful when considering an actual gathering of friends in real life. While images certainly add a fun element to any group interaction, today this is not a convenient process. At best, a small image can be produced on a phone screen, and to be shared with the group, the phone must be passed around. Given the attachment people have with their cell phones, not to mention the personal and sensitive data that they likely hold, passing the phone around to a group is not always a comfortable experience. Imagine if it were possible to make instant prints from images on your phone? These prints could easily be passed around by a group, and copies could be given a way as keepsakes.

SUMMARY OF THE INVENTION

It is a goal of the current invention to enable people to easily and conveniently make prints, and in some settings, to allow for "Instant Prints". It is a further goal of this invention to enhance the social media experience by allowing for the sharing of something that is not just a stream of electrons—but rather a token of social exchange that is tangible and has existence and use after the phone is turned off.

The current invention is designed to address the problems of personal printing by creating a simple appliance printer and supporting system that is easy to setup and use from your phone or other smart device. The printer can be left at home or some other convenient location (for example a hotel room while on vacation) and be printed to remotely. It can also be carried with you and used to print anywhere at any time, once again offering the capability of having "Instant prints".

In addition, it is a goal of the current invention to allow access to the printer by others in your group of family and friends (with your control and approval), by using a common social networking "follower" metaphor to uniquely enable this access. In this way, the user can send images to distant family and friends for printing and social sharing. Rather than competing with current social media stalwarts, it is designed to complement the experiences they offer by adding output capability that now does not exist. The current invention also supports a broadcast printing model that lets those with large followings to share something tangible with that group. For example, a pop star could share a moment from their day with their fan base by sending a personalized image [or meme] that has just been taken to the printers of their followers.

The result is a Socially Networked Portable Output System that allows prints and other possible outputs to once again play an integral role in an individual's personal and on-line social life. The Socially Networked Portable Output System will be hereby referred to as "The System".

While the preferred embodiment of the invention is focused on photographic printing, it should be recognized that the larger pattern here is focused on "Personal and Socially Networked and Distributed Fabrication". It is the ability to deliver an electronic pattern to a device which then fabricates something tangible and real. This pattern can be sent by the user to their own fabrication device, or they can send it to devices belonging to others, or even a large group of followers, thus leveraging a network effect.

The output of such a fabrication device will be referred to as a "Keepsake". A "Keepsake" is defined as a physical object produced by a machine acting in part under the control of a digital data stream in an irreversible process, so that two physical objects produced from the same data stream are similar but not identical, and the original data stream cannot be recovered by analyzing any physical object produced by the machines participating in the system. The concept of "resolution" (in, e.g., photo printing and 3D object manufacture via a process such as selective sintering, fused deposition or laser curing stereolithography) is relevant here: the digital data stream is higher resolution than the output machine, so that no analysis of the output object can establish whether one of two similar input data streams resulted in the object."

In this context, "resolution" is defined as the smallest spatial detail that can be measured for a given output system. For a photographic print, this might the ability to detect the gap in a line pair with a given separation. It should be clear that this can include color effects. For example, a line pair can be black, or it could have one line of a given color and second line of a different color. Various output devices will have different abilities to re-create such line pairs, and thereby have a different resolution capability. From this it can be seen that resolution also involves the ability to recreate patterns and textures as well as absolute colors. For a 3D printer, resolution characteristics will impact the ability of an output device to achieve a precise physical dimension or to re-create patterns or textures or colors with a given frequency response.

The fabrication device essentially takes electronic data and turns it into a Keepsake that is real and tangible. There are many such possible keepsakes and many different types of fabrication devices which are possible. Up until this point, printers have been discussed, but it can be easily seen that such a system could support many different output devices. Examples could include stereographic printers, 3D printers, plastic molding devices, laser etchers, etc., which can produce Keepsakes of many different forms.

For the purposes of this discussion, it is useful to define what is meant by the term "3D Printer". While in the common usage, the term "3D Printer" typically refers to a device that constructs three dimensional objects from Computer Aided Design (i.e. CAD) files through an additive process where the object defined as series of virtual layers and the output device fabricates the described object by adding material, one layer at a time, starting from the bottom and working its way up until the object has been built-up to completion. However, for the purposes of this invention, the term "3D Printing" will be used in a more expansive fashion to include all devices that allow for the creation of a three dimensional object through either an additive (where material is built-up to create the object) or subtractive (where material is removed from a blank of material in a process like of etching, milling, carving, or molding). In this usage, the output device can deal with a wide variety of possible materials when replicating a keepsake including plastics, polymers, wood, metals, ceramics, etc.

Using a variety of such output devices, users can extend the social networking experience so that items shared become 'real', tangible, and have existence beyond the softcopy screen. Such Keepsakes are tokens of social exchange that can have value that is both significant and lasting.

While the word "printer" will continue to be used at times in describing the current invention, it should now be understood that "printer" should be thought of in the larger context of an output device capable of the fabrication, manufacture or replication of some Keepsake that has physical existence and persistence.

Different output devices will have different inherent capabilities and therefore their ability to produce an exact replica is limited by those capabilities. However the intent is that Keepsakes produced will be similar but not exact representations. For example, two printers may have different print resolutions but the prints coming from each printer will produce an image with the same recognizable scene to the user.

In some cases, the diverse capabilities of various output devices make it desirable to create and send out "different" Keepsake datasets, where this difference consists of a customization of the dataset for the properties of the output device. Rather than sending a dataset that has more information than can be used by the device during fabrication, it is often advantageous for the system to render a dataset that has just the information needed for a particular replicator to achieve its replication goals. The advantage here often takes the form of more efficient data transfer and storage. For example, a 2×3 inch 300 dpi printer will require less pixel information than a 4×6 inch 300 dpi printer. A single color material 3D printer will require less information than a 3D printer that supports different color media output. The fundamental issue here is dealing with differences in the how the Keepsake is defined within the dataset based upon customizing it for the output device capability.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 18 is a flow chart showing a portion of a method performed by an embodiment of the invention.

FIG. 19 is a flow chart showing a portion of a method performed by an embodiment of the invention.

FIG. 20 shows an example request employed in an embodiment of the invention.

FIG. 21 shows an example request employed in an embodiment of the invention.

DETAILED DESCRIPTION 2.0 Desired Use Cases

To understand the scope and applications of the current invention, it is useful to review in detail some of the fundamental use cases it is designed to support.

2.1 One-to-One Output

The first two use cases focus on one-to-one Output. In these cases, we have a user who is selecting their own content for output onto their own printer. The first case, the Output Device is remote, and in the second case, it in the possession of the user.

2.1.1 Remote Personal Printing

Figure 1:
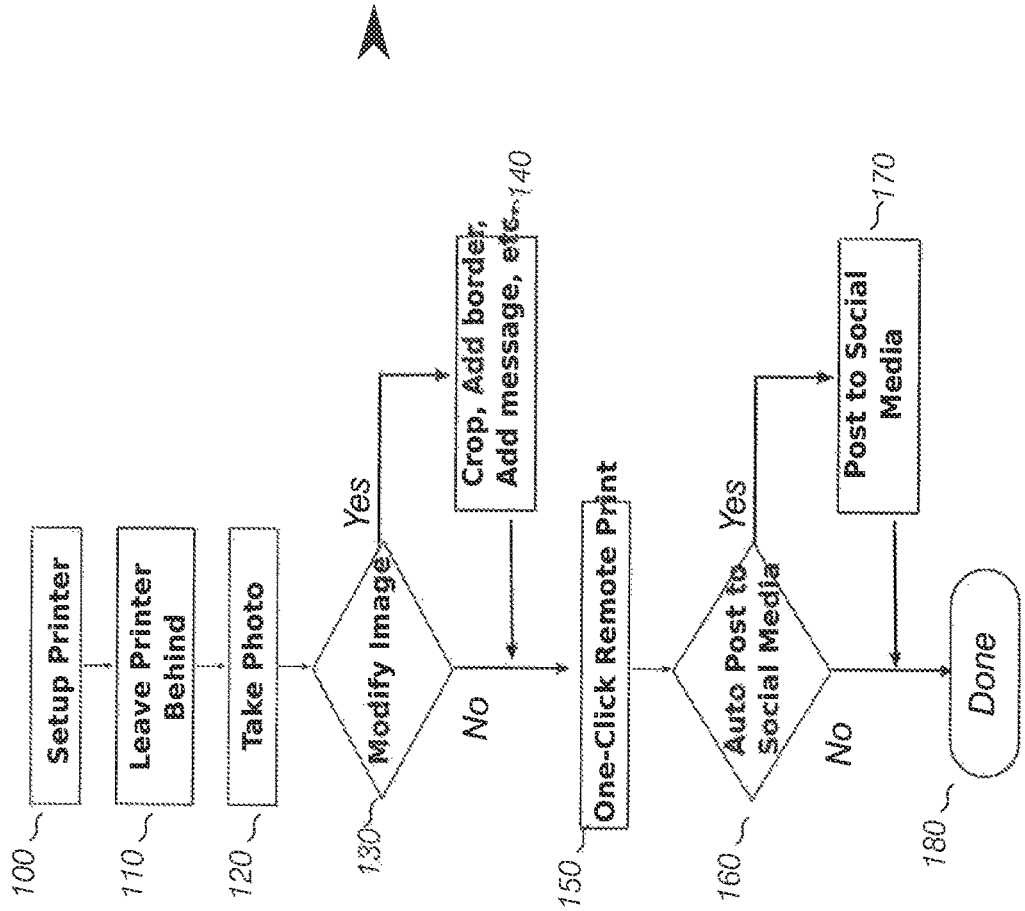
FIG. 1 shows a flow chart for Remote Personal Printing use case.

In this case, as represented in FIG. 1, the user sets up their printer and leaves it at some remote location. As they go about their day, they can send an image to their printer with a single click on their Smartphone using a special application.

In the preferred embodiment, this output device is small and easily moved from location to location. As such, the output device can be setup and left at home or easily taken to a different location and left there. In practice, the Output Device can be left anywhere where there is a power supply and a Wi-Fi zone that it can be connected to. For example, the Output Device could be brought to the office and left there, or when on vacation, it would be left in a hotel room.

The image the user chooses for output could be one that has been just taken (FIG. 1, item 120), or any image that is available to them on their Smartphone or smart device. The image can sent as it is, or can be modified (FIG. 1, items 130 and 140) by the user before sending. This modification could include cropping, adding borders, adding captions that can be printed within the borders, and a host of other customizations.

At the same time, the user also has the option of having the System post this image to social media of their choice (FIG. 1, items 160 and 170). If an image is worth printing, it may be worth sharing with friends and family. This mechanism allows the printing of output to be linked with their other social media behaviors. This posting can have comments or captions and will also contain a special hash tag indicating the source of the image posting is from the System (for example "#Lifeprint", where Lifeprint is a specific brand).

The Smartphone application will also allow the user to know the state of the output device. Given that the Output Device is in a remote location, this feature is an important tool for managing the remote resource. For example, in the case of a printer, it will tell them how many pages of media are still available for output so the user can make good decisions around the use of their remote printer. It can also tell them when the output device is having a problem which requires attention, for example in the case of a paper jam or in the case of a 3D printer, that it is out of the raw media that the finished product will be fabricated from.

2.1.2 Mobile Instant Personal Printing

Figure 2:
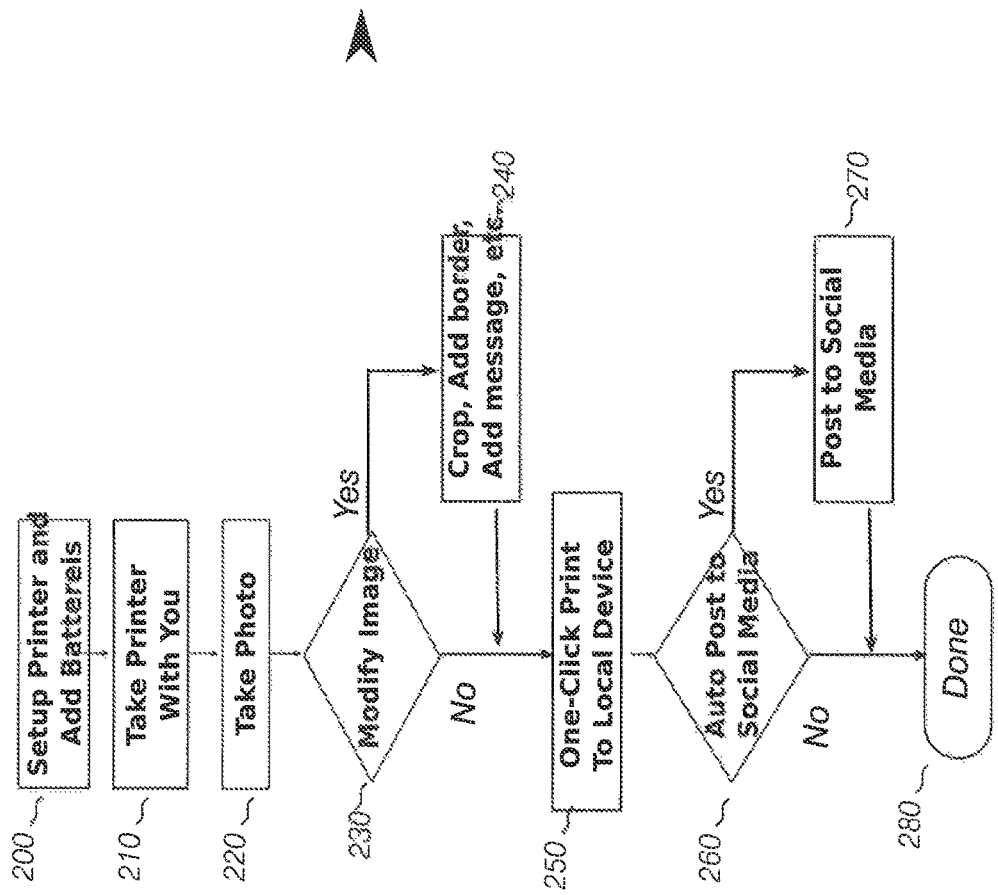
FIG. 2 shows a flow chart for the Mobile Instant Printing use case.

In this case, as represented in FIG. 2, the user sets up his new printer, charges (or adds) the printer's batteries, and takes the printer with them as they go about their day. At anytime and at any place the user can decide to make an instant print.

In the preferred embodiment, the Output Device is small, portable; battery powered, and designed to be used in a mobile application. The Output Device can be taken out when printing is desired. Other forms of the Output Device are designed to be used in real-time as they are carried in a backpack, bag, or purse. They are designed to print in any physical orientation and collect output so that jamming or output damaged is prevented.

When used in the mobile mode, the Output Device is controlled by the Smartphone or other Smart Personal Device using a short range wireless network such as Bluetooth. In this way, the Smart Personal Device acts a direct controller of the Output Device, while also maintaining a connection to the broader System by leveraging its Wi-Fi or cellular internet connection.

If the printer is not already on, the user turns it on, and then selects the image they want to print. This image can be one they just took or one that was already available on the Smartphone. The image can be printed as it is, or can be modified by cropping, adding borders, and adding captions that can be printed on the borders, and a host of other customizations.

At the same time, the user will have the option of automatically posting this image to social media of their choice. This posting will have comments or captions and will also contain a special hash tag indicating the source of the image posting (for example "#Lifeprint").

The phone application will also allow the user to know the state of printer. For example, it will tell them how many pages of media are still available and the current state of the battery charge so the user can manage his remote printer utilization.

2.2 One-to-Many Output

The next two use cases focus on One-to-Many Output applications. In these cases, we have a user who is sending their content to Output Devices that are owned by others. The user could be sharing with one person, or many.

2.2.1 Third Party Social Network Output

Figure 3:
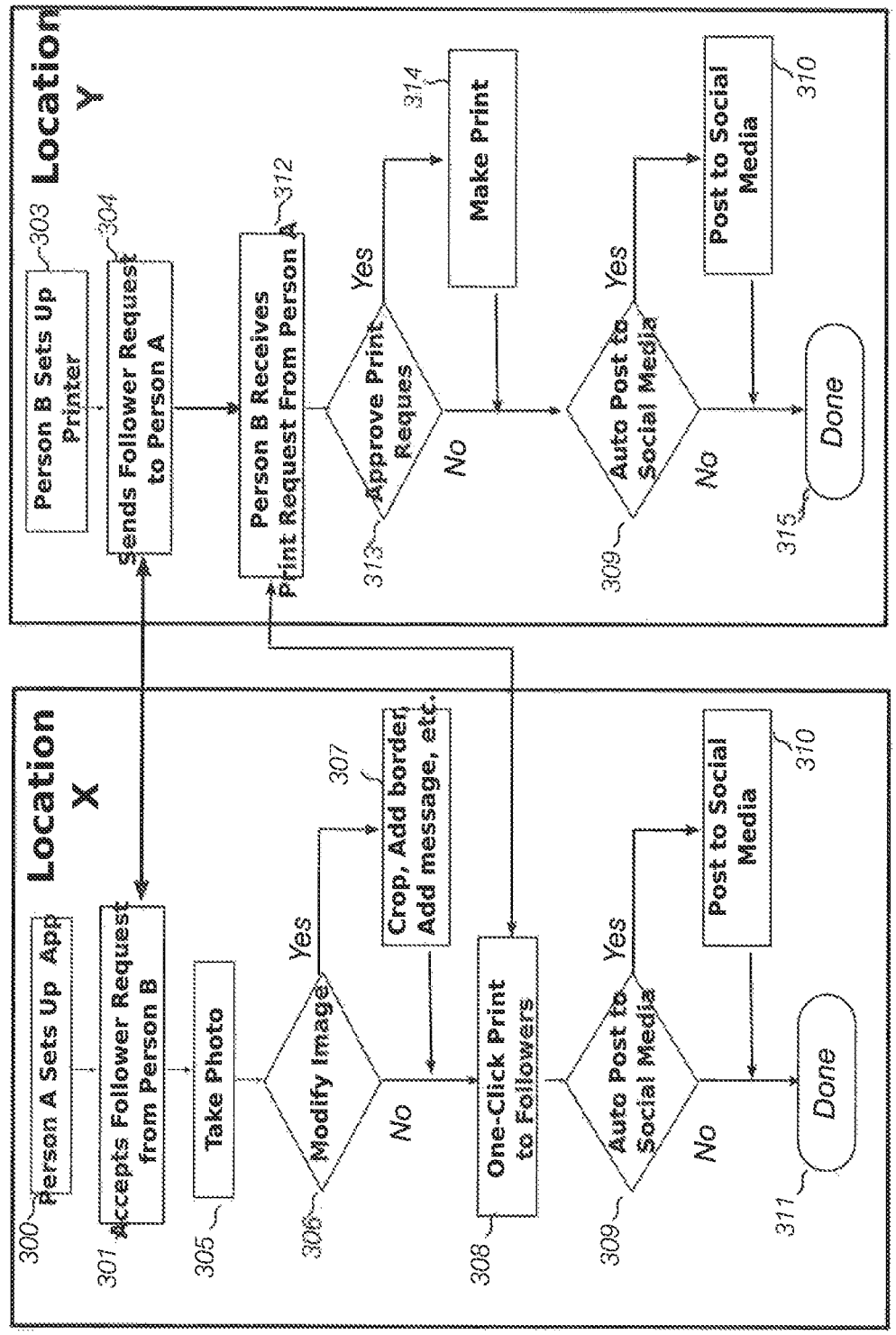
FIG. 3 shows a flow chart for the Third Party Social Network Printing use case.

In this case, as represented in FIG. 3, the user sends output to Output Devices owned by others, or (viewed from the receiving side) others can send images to your Output Device. People who own an Output Device can choose to "Follow" others. Individuals can use a Smartphone application to share images with their "Followers." In this case, the well known social media "Follower" model has been combined with Output Devices to form a Network of Socially Connected Output Devices.

A new Output Device owner would set up their device and then identify those individuals they would like to "Follow". The System supports a search function that allows other members of the System to be found. Searches can be made using real names, the System User ID, or the User ID's associated with different Social Media sites that users have listed in their profile. A list of people found that meet the search criteria is displayed, and the user can view the person's profile (if permissions have been set to allow this) or they can chose to "Follow" a given person (FIG. 3, item 304).

If the person they would like to follow does not have an account with the System, they can send that person an invitation with a link to join the System so that they may be "followed." The contact list on the Smartphone can be used to facilitate these external invitations. If the person invited joins the System, the inviter is notified and has the option of following the new user.

The person being followed does not need to own a printer to participate. Instead they simply install an application and create an account. In some cases, the person being followed gets a follower request and has the option of approving those individuals that join the ranks of followers (FIG. 3, item 301). In other models, anyone can follow anyone else, and no requests or approvals are required.

Once someone has followers, they can choose to send an image to those followers. They may have one follower or many. They can send the image to all of their followers, or selected sub group, or to a single chosen individual. A unique aspect of the preferred embodiment is that follower's Output Devices can be reached directly when the devices are statically connected to the internet with a Wi-Fi connection, or indirectly when they are in a mobile mode, being carried about by their owners.

The image shared can be one they just took (FIG. 3, item 305) or one that was already available on their Smartphone. The image can be printed as it is, or can be modified (FIG. 3, items 306 and 307) by cropping, adding borders, and adding captions that can be printed on the borders, or a host of other customizations.

At the same time, the user will have the option of automatically posting this image to social media of their choice. This posting will have comments or captions that they have provided and will also contain a special hash tag indicating the source of the image posting (for example "#Lifeprint").

The Output Device owner will get a notification that someone they are following has sent an image to their device for output (FIG. 3, item 312). At this point they have several options. They can approve the image for output (FIG. 3, items 313 and 314), they can save the image on their Smartphone, or they can decide they do not want to either print or save it, and the image is deleted. In any case, the sender will often only know that the shared image was received—they may not know what the follower has done with the image.

The follower also has an opportunity to automatically post the received image to a selected social media site. They can add comments and responses to the printed image, and the posted image will be tagged with those comments and well as a special hash tag indicating the source of the image posting (for example "#Lifeprint")—in addition the "@" operator symbol can be used to direct the response to the sender of the image.

This mechanism of posting and adding comments or responses is very important. When a person shares something with others, they are offering some token of social exchange. They have "put themselves out there", and they expect some form or response or reaction. It is important for the sharer have some emotional payoff for the sharing done. The most common form of "payoff" is a reaction by receiver. This acknowledges the sharing and helps reinforce social bonds by completing the exchange. This can be accomplished by leveraging existing communication or social media channels, or by directly supporting it within the System. Auto posting can to social media can be done by both the sender and receiver of images, facilitating social media interactions that provide feedback and allow the System to play an integrated roll in the on-line social life of their users.

There are times when it is useful to exert greater control over what is done with content shared with a follower network. Perhaps the sharer would like the follower to have a print, but would not like them to be able to save the image and use if for other purposes. Or perhaps the user would like to limit the number of prints that could be made from the image. The System provides support for constrained output requests that allow this greater control to be exerted over shared content.

2.2.2 Scalable Broadcast Output

Figure 4:
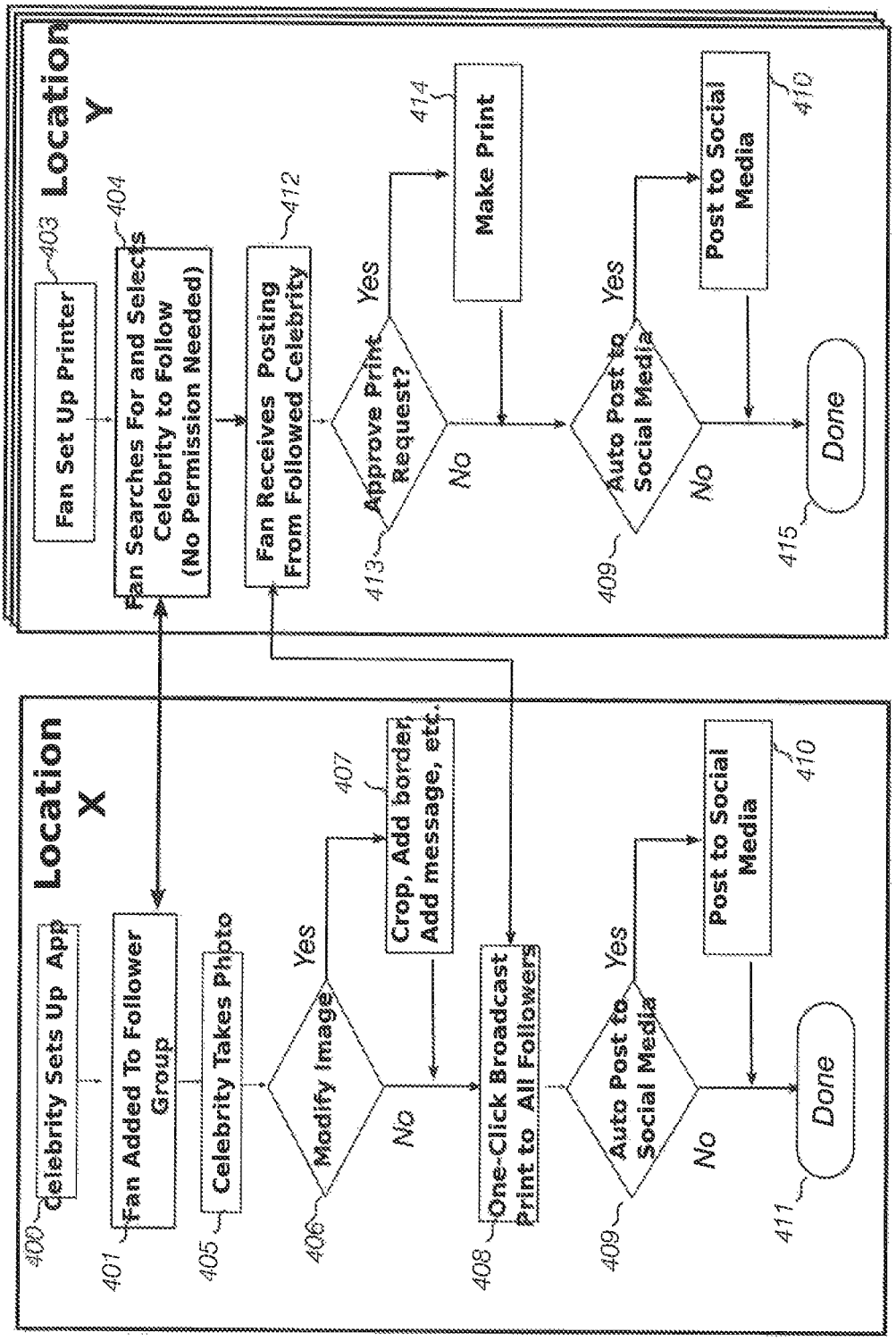
FIG. 4 shows a flow chart for the Scalable Broadcast Output use case.

This case, represented in FIG. 4, is similar to the previous case but is greatly expanded in scale. For example, a celebrity or some other public figure may have a large number of followers (i.e. a fan club), but they still have the option of sharing an image with their large follower network.

A celebrity can take a picture during their day and share that moment with their following. Followers get a tangible print from the celebrity and can feel a direct connection to them. This kind of exchange has significant value for all involved. For the person being followed, it provides an opportunity to interact with their follower base in a way that provides their followers with something tangible. They can do this with little or no cost.

From the follower's point of view, they get a chance to connect with someone they want to follow in a very personal way. A celebrity can send a special moment from their day directly to them, providing them with a print and a keepsake. The cost to the follower is the simply cost of print, mere pennies.

From a business perspective, the cost of offering this service is more offset by the cumulative burn of media from such broad distributive actions.

The sharer could be a celebrity, a politician, a sports figure, a sports team franchise, a performer—the list of potential Scalable Broadcast users is large.

The Sharer chooses to send an image to their followers. The image they share can be one they just took or one that was already available on their camera. The image can be printed as it is, or can be modified by cropping, adding borders, and adding captions that can be printed on the borders, or a host of other customizations. They can also add overlays, corporate logos, branding information, etc. At the same time, the celebrity will have the option of posting this image to social media of their choice. This posting will have comments or captions that they have provided and will also contain a special hash tag indicating the source of the image posting (for example "#Lifeprint"). Because of the scale of the follower network, the sharer may get a status report updating the progress of distribution to his follower base.

From the Follower's point of view the experience identical to the previous case. The printer owner will get a notification that someone they are following has sent an image to their Output Device. They can approve the image for printing, they can save the image on their phone, or they can decide they do not want to either print or save it, and the image is deleted. In any case, the sender may know that the shared image was received—but they may not know what the receiver has done with the image. The Follower also has an opportunity to automatically post this image to a selected social media site. They can add comments and responses to the printed image, and the posted image will be tagged with those comments and well as a special hash tag indicating the source of the image posting (for example "#Lifeprint")—in addition the "@" operator symbol can be sued to direct the response to the sender of the image.

The concept of a Constrained Output Request can have great value with this use case. The content shared by large scale Broadcast printers may have copyright or branding issues involved, or the sender may wish to constrain the nature of shared output to maximize the perceived value of the output sent. In these cases, having the ability to share output in modes such as "Print Only", "Print Once", or "Print Now" can play a significant role.

2.2.3 Group Definition

Creating output for your personal use is fairly simple. Posting output for your entire group of followers is also fairly simple. It begins to get more involved if you wish to share content with a smaller subgroup of your followers. One way to support posting content to a smaller group is to add names, one at a time, of the individuals that you wish to include. Another way to accomplish this is to review a scrolling list of your followers, clicking on those in that list you wish to receive the shared content. If you have a large list of followers, this process can become tedious and inefficient.

To facilitate this process, the System allows the user to create Sharing Groups. Sharing Groups are predefined distribution lists that represent selected subsets of your followers. For example, a person might define one Sharing Group to cover their direct family members, another covering their high school friends, and another covering their college friends. The Sharing Groups definitions are stored as part of the user profile and can be reviewed and edited at any time by the Smart Personal Device application.

Sharing Groups can be used within the System and also used as a reference when interacting with users outside of the System. For example, an Auto Post to an external Social Network might be influenced by the Sharing Group that is selected.

2.3 Many-to-One Output

The typical use of a follower network is for the person being followed to share content with their followers. This is the one-to-many model. However, it is possible to have a circumstance where this model can be inverted and used in a many-to-one mode.

2.3.1 Output Invitations

In this case, a follower (someone who owns an Output Device) could send an "invitation" to those they follow requesting that output of some specific nature be sent their Output Devices.

The invitation could come from an internal messaging feature of the System, but could equally well be handled by leveraging one of many existing communication channels such as email, text messaging, or social media postings.

For example, let us say that a user was recently at their daughter's music recital and wanted to make a scrapbook documenting that event. The user could send an "invitation" to members of their network (people they follow) that were also at the recital, asking them to send pictures taken of the daughter for use in the scrapbook. In this way, many people being followed could send input to one specific printer.

The method of sending and receiving this content is identical to the other use cases already described. The difference here is how the sharing is initiated, and the resulting sharing pattern from this request.

This model could be used in the Scalable Broadcast Output model as well. For example, a celebrity could have a contest where they invite their followers to show what they did with previously shared content. The followers would take pictures of the creative things they have done with the keepsakes the celebrity has shared in the past and send those in. The winning images from the contest are Broadcast Printed to the follower network. In this fashion, a celebrity can engage with his follows, followers feel they are engaged with the celebrity, and winners are singled out and get celebrity attention, as well as the attention of the following network.

2.4 Combined Modes: Output Cloning

Given the four primary use case modes defined, it should be noted that combinations of these modes are also possible. For example a user might want to print out an image for their own personal use, but at the same time they might want to share this with either a small group, or in other cases a very larger group (Broadcast Output). The ability to combine these modalities creates a more efficient workflow for the user, thus a more positive experience.

From a system implementation perspective, the net effect of these combined modes to create a type of "Cloning" effect. The behavior of one Output Device is echoed by the actions of a group of Output Devices. This "Cloning" of behaviors creates a distributed form of fabrication that can be extremely powerful for those cases where the scale is large.

3.0 System Overview

Figure 5:
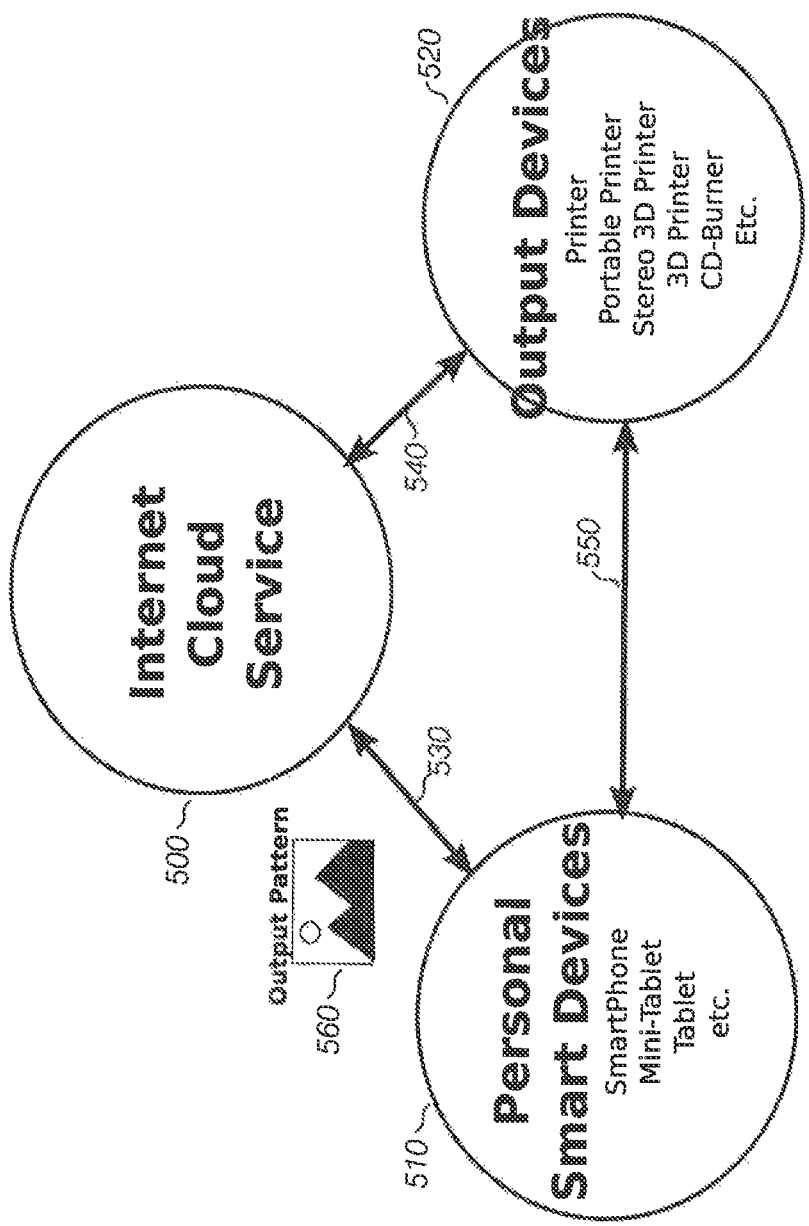
FIG. 5 shows the elements or building blocks of the Socially Networked Distributed Printing System.

Having reviewed the objective of current invention, one can begin to consider the design of a system that would provide these desired experiences. First we can consider the fundamental elements of the system, as seen in FIG. 5.

3.1 The Smart Personal Device

This a portable device (FIG. 5 item 510) which has a combination of computing power, digital storage, wireless networking capability, internet access and onboard sensing resources such as a camera, GPS, etc. The best and most common example of this today is the modern Smartphone, however other devices such as min-tablets, and full-size tablets and others would also be suitable in this application.

3.2 Cloud Services

Cloud Services, as represented in FIG. 5 Item 500, are Cloud-based resources that play key roles in enabling a system of devices to connect and interact to produce the desired overall system experience.

3.3 Output Devices

Output devices, as represented in FIG. 5 item 520, are keepsake fabrication units that take a digital file pattern and create something that is tangible and has physical existence and persistence. Preferably, such devices should be simple appliances, specialized to do specific form of output and are portable in nature. Photographic Printers, Stereo Printers, 3D Printers, CD-Rom Burners are examples, but they are many such output devices that exist today and will exist in the future that would fit this category.

3.4 Wireless Network Connections

The previously listed elements are connected to form a network, as represented in FIG. 5, where the connections (FIG. 5, items 530, 540, and 550) are preferably wireless in nature. Different forms of wireless connections can be used for various applications. In the current embodiment, the Output Device Connects to the Smart Personal Device (FIG. 5 item 550) with a Bluetooth connection. Bluetooth is used because it is commonly supported, low in cost, has low power consumption, and has sufficient bandwidth for photographic printing application. The Output Device connects with the Cloud (FIG. 5 item 540) via Wi-Fi. Wi-Fi connectivity is fast, commonly available, and used in circumstances where the Output Device is likely to be plugged into a wall socket rather than running on batteries. The Smart Personal Device connects to the Cloud (FIG. 5 Item 530) in one of two modes: Wi-Fi can be used when it is available, or a cellular connection when Wi-Fi is not available. Not all connections are active at the same time, nor are they required to be.

3.5 Output Pattern File

The Output Pattern File (FIG. 5, item 560) represents a digital representation of the desired output and is sent to the Output Device. This file contains all of the data necessary to enable the Output Device to fabricate the desired output. In the case of a photographic printer, this would consist of a digital image file. Different output devices will require different pattern files.

4.0 Architectural Principles

Elements of the system must be combined in a way to create an effective system. The System Architecture is a specific set of design choices made for how this combination will occur. It is often best to decide on a series of overarching design principles when considering architectural choices.

There are three primary locations where functionality and storage for our system can be hosted: the Smart Personal Device, the Cloud, and the Output Device.

Functionality can be easily hosted in the Cloud; however the compute, storage, and bandwidth costs when located here constitute an ongoing expense that is incurred for a long as the System is supported. These costs must be covered by a business model.

Functionality in the Output Device will increase unit manufacturing costs and will have an effect on either the market price point or the margins for that offering.

Functionality placed in the Personal Smart Device will drive slightly higher development costs but can greatly minimize ongoing operational costs. The Personal Smart Device constitutes a powerful resource pool (Compute Capability, storage, network access, and bandwidth) that is already provisioned by the user.

For the current embodiment of the Invention, the following principles were embraced:

4.1 Leverage the Resources of the Smart Personal Device

Put as much functionality into the Smart Personal Device as possible. The user has already paid for it, and covers the cost of network connectivity. The user's intent was to use this device to enable experiences that were desired by the user, so it makes sense to leverage this resource as much as possible as a way of minimizing operational costs and maximizing the quality of the user experience.

4.2 Keep the Output Device as Simple as Possible

The design approach chosen here is to minimize the functionality of the Output Device. Do critical output functions and push else off to other parts of the system. This has many benefits. It reduces the unit cost of the device. It simplifies the interfaces with the system. It turns the device into an appliance that is easy to use, with clean lines and minimal interfaces to deal with.

4.3 Minimize Cloud Footprint

To minimize operational costs, do everything possible to push functionality to the Smart Personal Device and to simplify the operations supported by the cloud. This is a departure from the trend of pushing more and more functionality into the Cloud.

4.4 Grow Informational Assets from Day One

A system is designed to meet a perceived user need. As a new system rolls out, it is important to gather data that will measure the actual performance of the system and how the user actually interacts with it. It is important to know the reality of the system experience rather than what is anticipated. One design principle embraced is the idea that the mere use of a system—simply doing what the system was designed to do—should automatically capture and generate informational assets that provide value to the business. Where possible, the System should be designed to capture and collect this information, which includes:

User Information: grow our knowledge of the user as accounts are created and over time.

User Behaviors and Context: individually and in aggregate. Determine how and when the user uses the System as opposed to how it was thought they would use the system.

System Performance: how each subsystem is performing—lag time, errors, etc.

Customer Relationship Management: capture information that will drive user engagement, encourage desired behaviors, create loyalty, and produce user feedback that will improve current products and shape future products.

Resource Management: track media and power consumption

4.5 Provide for a Social Payoff

As previously discussed, sending a print to friends, family and followers is an act of sharing. Sharing is a two-way street. Almost anyone sharing a comment or image on Facebook, Twitter, or Instagram is putting "themselves out there" and is hoping for a reaction or response. That reaction or response provides an emotional payoff that reinforces the sharing behavior. Sending a print is no different. The system should support some form of feedback mechanism for received prints in order to reinforce behaviors and ensure a social payoff Another form of social payoff is Status. Twitter measures status in followers and trending traffic. Facebook status is measured in friends and news feeds. LinkedIn is about the network size. EBay is about the number of transactions and feedback scores. The System should have some form of status ranking as well. A good measure of this media burn, a rank that is a measure of the number of prints personally made or made indirectly through network sharing. These actions should be used to promote the social status of its most active members. This could also be tied to CRM and loyalty programs.

4.6 Complement and Leverage Other Social Networks

Networks are valued by their scale. Early on the scale of the Printing Network will be small, so it is a strategic imperative to grow this scale as quickly as possible. One way of doing this is to enable interactions between the Print Network and the other social media networks whose scale is already established. One example of this is the Auto posting of images printed, along with associated comments. This drives awareness and begins to tap into the scale of others.

Another way is to use existing social networks for tasks that might normally be done within the Printer Network. For example, Feedback on shared images can be channeled via existing social networks.

Finally, another way might be to encourage behaviors in other social networks that drive print requests to the Print Network. For example, developing a way where normal image sharing activity on another network is used to drive print requests on the Printing Network. This would suggest architectural support for external print requests initiated by members who have accounts in other Social Networks. This could be done by establishing an account on the various social networking sites and allowing people to target input directly to that account—then taking that input and converting to a print request on the System. Alternatively, an indirect approach could be done where a server could be setup to scan Social Media feeds looking for hash tag coded Output Requests and importing them into the System.

4.7 Minimize the Size of Output Pattern Files

A particular Output Device will have some resolution or innate capability to produce output of a particular quality level. The goal of the System should be to provide as much information as is necessary to feed the output engine so that it can produce the best quality possible, and not one byte more. As an example, a 300 dpi 3"×4" printer can only effectively deal with a 900×1200 image. This is considerably smaller than the typical size of images captured with modern SmartPhones. It is desirable to produce a print resolution image at the source and only transfer that smaller image through the system. This will greatly minimize bandwidth usage, system lag time, and increase the quality of the user experience. This is very simple to do when the system only supports a limited set output options. However, as output options grow there still should be the desire to only move about the least amount of data possible to enable desired output.

5.0 The Role of System Elements

Given the above stated principles, a description of a preferred embodiment can be made and will be described in the following sections. However, it should be clear to those skilled in the art, that other configurations could be made with associated trade-offs in performance, cost, and efficiency.

5.1 The Role of the Output Device

The role of the Output Device is to become a very simple appliance. Designed to take minimum data set and drive engine to create high quality output. It should have few or no controls and use wireless communications (Wi-Fi and Bluetooth in the current embodiment) as its sole interface to the outside world. It will handle a minimal of necessary setup functions, manage communications, log, and report system utilization, exceptions and subsystem status.

5.2 The Role of Cloud Services

Cloud services will act as a central repository for Accounts, User Profiles, and System logs. It will also handle authentication, security and encryption for all network Cloud connections.

It will act a routing mechanism for delivering output requests, but will only support very short term cache storage to facilitate this function. It will drive notification services, and have special functionality to handle the bursty loads driven by large scale Broadcast Printing.

It will enable any transcoding necessary for any Smart Personal Device to interact with any Output devices. This is a departure from the trend of having local drivers to handle the details of how a device works. In this System, all devices preferably connect to the Cloud and each other with simple APIs. Transcoding modules manage device differences. Transcoding may be done within the Cloud, or in some cases, the Cloud provides Transcoding data to the applications on the Smart Personal Devices to allow direct device connections.

It will provide internal performance logging, reporting and analytics support for all informational assets.

Finally, it will provide a gateway for accepting print requests from external social networks.

5.3 The Role of the Smart Personal Device

The Smart Personal Device will be the preferred location for computation and storage needs, and will act as the primary User Interface to the System. It will:

- Manage setup and configuration
- Manage account creation and updating
- Communicate printer state and resource levels to the user
- Provide a mobile communication link to the Output Device
- Log and capture:
- User actions and profile information
- Application errors and performance
- Be a source of Metadata (date, time, location, etc)
- Handle Auto posts to external social networks
- Supports links to web sites that drive the sales of hardware, accessories and consumables In short, the Smart Personal Device is the functional core to the system.

5.4 The Role of Network Connections

Network connections are the glue that binds the system together. While tethered connections could be used (i.e. Ethernet Cable), the current embodiment focuses on wireless connectivity between the nodes.

While FIG. 5 shows the system with all network connections intact, it should be understood that in various use cases, at least one of those connections may not be available. The System is designed to accommodate this fact.

For example, when the printer is at home or left behind in a hotel room, the Output Device connection mode is Wi-Fi. The Bluetooth connection will not be possible since the Smart Personal Device will not be close enough to make the connection. In this case, the Smart Personal Device connects with the Cloud via Cellular or Wi-Fi network, and the Cloud then connects to the Output Device.

When you carry the printer will you as you go about your day, the printer is in mobile mode. In this case, a Bluetooth connection to the Smart Personal Device is the primary connection. The Smart Personal Device will be in range, and the bandwidth of the connection is more than sufficient to meet output needs. In the mobile case, there is no guarantee that a Wi-Fi zone will be available, and since Wi-Fi is more power hungry, it is not the best choice to use when the Output Device is running on battery power. The Smart Personal Device can send print requests directly to the printer via the Bluetooth connection. The Printer can still be connected to the Cloud indirectly by using the Smart Personal Device as a proxy. Printer status can be communicated to the Smart Personal Device, which can then pass that information onto the Cloud via its connection to the internet. Print requests from people you follow will come to the Smart Personal Device via the Cloud, and those requests can then be passed onto the printer via the Bluetooth Connection.

Once the user returns home, the Output Device can then reconnect to the Home Wi-Fi network. In this case, the Output Device has the possibility of using either the Wi-Fi or the Bluetooth connection. Which one is used is likely a function of how the Output Device is getting its power. If the Output Device is plugged into a wall outlet, power is no longer limiting and the Wi-Fi Connection is used. If the device is still working on battery power, the Bluetooth connection may be used.

It is a property of this system that it will self configure to use network connections based upon availability and efficiency. This is done on an automatic basis and the System will act to propagate data as necessary to create a seamless experience.

It should also be noted that while the Output Device is setup to connect to the user's home Wi-Fi network, it can also be configured to connect to any Wi-Fi network that is available at any time. Thus it is possible to set up the Output Device to use a remote Wi-Fi connection as would be the case if a user was on vacation and wanted to leave his printer in his hotel room while he was out and about exploring the city.

It should also be noted that user will expect that the System will be both secure and private. Information being sent on any network connection should be protected from access by unauthorized persons. It should also protect the Output Device from being controlled by an unauthorized Smart Personal Device or Internet connection. In the preferred embodiment, this is accomplished by using SSL 3.0 encrypted connections, and using a Cloud-based Authentication scheme when devices are connections are made.

5.4 Alternative Functional Allocations

Figure 8:
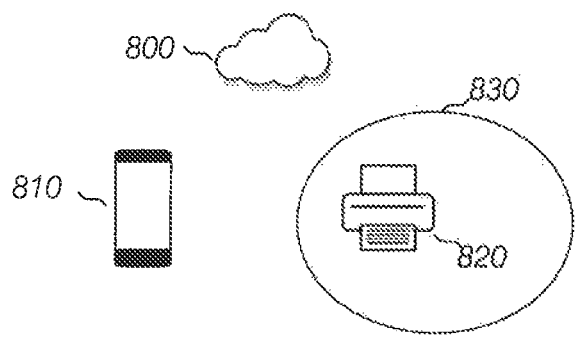
FIG. 8 shows possible functional allocations for supporting Output Device Logical control.
Figure 8:
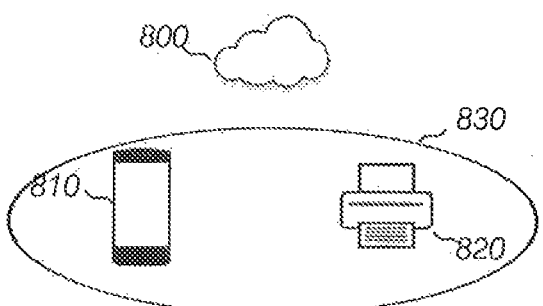
Figure 8:
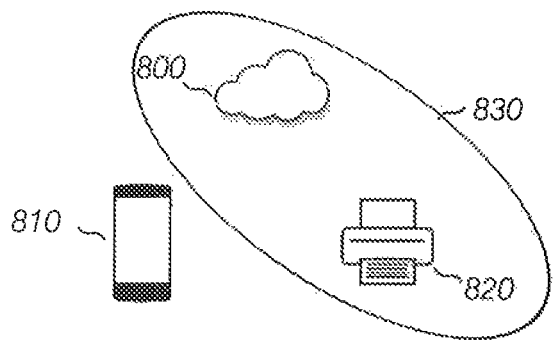

The functional allocations described in the previous section are the currently preferred embodiment. However it is clear that higher order logic associated with the fabrication device is necessary to enable the Socially Networked Portable Output System functionality. The output device, along with its controlling software can be thought of a logical unit. Given that each component of the system has its own processing resources and capabilities, it is possible to distribute and allocate elements of this logical unit in various ways. This is shown in FIG. 8, where three such possibilities are shown. The Three basic components of the systems, the Output Device (FIG. 8, item 820), The Cloud Service (FIG. 8, item 800), and the Smart Personal Device (FIG. 8, item 810) are shown in the cases where different functional allocations are made. In FIG. 8 Case #1, the Logical Unit (FIG. 8, item 830) is contained all within the Output Device itself. In this case, the output device has sufficient compute resources and capabilities to allow the printer function on its own when it comes to interacting with the system. In FIG. 8, Case #2, some of this functionality has been allocated to the Smart Personal Device (FIG. 8, item 810) and the Logical Unit is (FIG. 8, item 830) is shown spanning the output device and the Smart Personal Device. In FIG. 8, Case #3, we can see that some of the functionality of the Logical Unit (FIG. 8, item 830) has been allocated to the Cloud Services such that it now spans the output device and the Cloud Service components. Other allocations of functionality are of course possible.

6.0 Output Requests

The System of the current invention is designed to enable output. This is enabled by an Output Request. The Output Request involves both a data structure and set of protocols used by the system to manage Output creation in its many forms.

6.1 Personal Output Requests

Output Requests that consist of a user selecting personal content from their Smart Personal Device to be printed on their own Output Device can be quite simple. The user selects the image desired, and then has the option of modifying that image. This modification can consist of a cropping operation, adjustments to the quality of the image, determining the type of border desired and any captions that are to be written in that border, etc. Once complete, the image is processed to create an appropriate Output Pattern File. This Output Request is then sent to the Output Device either directly via Bluetooth or indirectly via the Cloud.

6.2 Print Requests from those Being Followed

When someone is being followed, they can share images with their followers. This sharing is consists of creating an Output Request, and the selection to who should received the Output Request. This process is very similar to the process used by a user doing a personal Output Request, but involves an extra step of selecting the target audience. Following this, the Output Request is transferred to the Cloud. The Cloud then sends notifications to the followers targeted by the user.

The user will get a notification of the Output Request. This notification will identify the sender, and present a thumbnail image of what is to be output. At this point, the user must make a decision as to what to do with the Output Request. They have three options: 1) Approve the Output Request, and chose the number of prints desired for the image, 2) Save the Image on their Personal Device instead of sending it to the output device, 3) Rejecting the Output Request.

If the Output Request is approved, it is forwarded to the Output Device. If the Image is saved rather than printed, it will be stored in the Smart Personal Device. The User may use it in whatever way they want, including submitting it for printing at a later time if they so desire—for example, after they purchased more media. Finally, if they reject it, the Output Request is deleted from the system. In any case, the sender may only know that the Follower received the request; what was done with shared content need not be reported back.

This approval process is the default behavior of the system. However, the user has the ability to build and manage the list of people that they follow. This management process includes the ability to pre-approve print requests from a given person they are following. In this case, Output Requests from that person will always be directed to the output device. By the same token, a person being followed can set up so that all of their content is either saved, or blocked (which is a form of auto-reject).

The approval process can also be modified by Constrained Output Requests, which impose limitations for what the user can do with shared media. Based upon the constraints imposed upon a specific Output Request, the options displayed to the user during notification may be limited.

6.3 Constrained Output Requests

When content is being shared with followers, there are many times when some degree of control is desired as to what can be done with content being shared. For example, it may be that the sender would like to share a print of an image, but might not want anyone saving that image and using it in ways they cannot control. For example, you may not want someone taking a photo of yourself, penciling in a mustache and posting it on Facebook.

In other cases, there may be copyright or business issues involved that cause the sender to want greater control for what can be done with an image. For example, Broadcast Printing by a Sports Team of player "baseball" cards may be seen as having greater value if only one copy could ever be printed.

To support this desire for greater control of content, Output Requests can be constrained in the following possible ways:

Print Only: Saving of the image is disabled.
Print Once: Number of copies to print disabled (defaults to one), Save feature is disabled
Print Now: Print with a narrow time window
Time limited Usage: Save & Print enabled for limited time window, then image is deleted
No Auto-Post: restrict auto-posting of content to an Social Network

6.4 Auto Posting on Social Media

Any time an Output Request is being created or received, there may be an option to Auto-Post content to a Social Network of choice. When this option is chosen, the image, along with comments, is posted by to the selected social network site along with special hash tags to identify where they originated.

This serves multiple purposes. It allows those sharing an image to reach a broader network in way that also acts to promote and grow awareness of the Printing System. It also leverages social media to be a mechanism to communicate information about the content being shared. The receiver can use a similar function to provide reaction and feedback to the user. In this case, special symbols such as the '@' symbol can be used to direct feedback to a specific person.

Auto Posting can be implemented as Cloud function, however in the preferred embodiment, this function is implemented on the Smart Personal Device. This minimized the Cloud footprint, and better leverages Smart Personal Device resources.

7.0 System Setup

An important aspect of the System is how it is setup, configured and used.

7.1 User Profiles

Members of the Printing System will generally have an account with the System. Each account has a User Profile associated with it. This profile serves many purposes. From a business and operations perspective, it contains and provides key data around identity, communication channels, and security. In addition, it can be used to store Informational Assets around user behaviors and preferences.

The user profile also contains information about other social networks that a user is involved with, including user ID's and passwords, so that the user may interact more seamlessly with those networks.

This information also enables a search function that allows users to find one another so that they can follow and be followed. Searches can be indexed on real names, system user ID's, or even user ID's from other social networks they are involved with.

When found, the search can review the user's profile and learn more about the person they are following. Thus the user profile represents an opportunity for the user to control the image they project to the world via their Profile.

Finally, the user can set the privacy level they wish. Three levels are currently supported include:

Open: You can freely find this user in search, look at their profile, and follow
Permission Needed: Visible in search, but only name is shown—no other profile information is shared. You must send a follow request before following is allowed
Private: Not findable or visible to others.

Profiles can contain:

| Data Field | Description | Notes |
| --- | --- | --- |
| User Name | operations | Primary ID in the system |
| Actual Name | Legal name | Useful for general profile info, for communications with user, CRM uses. |
| System Status | Some "rank" or measure to "reward" user with based upon network size and prints made or sent. | Reinforces valued behaviors, provides sense of accomplishment and status for user. Flags those users that are force multipliers in Lifeprint network. |
| User Photo | Small photo of user. Perhaps pulled in from other Social Network account. | Enhances interaction. Allows user to provide and control a public image |
| Email address | at least one or more confirmed email address | Account authentication, password resets. User communications and engagement |
| Gender | M/F | Market Segmentation, CRM |
| Date of Birth | | Social interaction (birthday notices), Market Segmentation, Marketing birthday card print opportunities, CRM |
| Address | Mailing address | Segmentation, facilitate media or printer purchases |
| Printer Owner? | Printer owner (follower) vs. Non owner (person that is followed) | CRM - targeted marketing opportunity |
| Printer Type | When more than one printer is supported. Type would imply capability and image processing needs | Knowing who has what. Allow network to drive there right print image to the right printer. CRM and targeted marketing. |

| Data Field | Description | Notes |
| --- | --- | --- |
| Printer ID Security Preference | Unique identifier for System Willingness to expose printers to others | Operations 1) Open: You can freely find user in search, look at profile, and follow 2)Permission Needed: Visible in search, but only name is shown. You must send a follow request before following is allowed 3) Private: Not findable or visible to others. |
| Facebook ID | Facebook account | Inherit profile info, auto posting support Potential for future printing driven by Facebook behaviors |
| Twitter ID | Twitter account | Inherit profile info, auto posting support. Potential for future printing driven by Twitter behaviors |
| Instagram ID | Instagram account | Inherit profile info, auto posting support. Potential for future printing driven by Instagram behaviors |
| List of People you Follow: Profile link Relationship Prints Requests received Prints Requests printed Print Requests saved Print Request Deleted Feedback messages sent | Link to other users account profile Relationship to user (Father, friend, celebrity, etc) Approval mode Print requests Received (both a count and log of requests are kept) Number of print requests that you either printed, saved or deleted Feedback messages you sent regarding prints made, (both count and log of actual messages) | Network Interaction analysis. User behaviors around printing from those followed. |
| List of People Following You: Profile Link Relationship Print Requests Sent Feedback messages received | Link to other users account profiles. Relationship to user (Father, friend, celebrity, etc) Print Requests that you sent (both number and log) Feedback Messages that your received (both a count and a log of messages) | Network Interaction analysis. User behaviors around sending prints to others |
| Technical Support Log | Record of any technical support interactions | CRM, Problem analysis |

Some of this information is entered at the time of account creation. Some is added by the system itself as the user interacts with the system. Some is added over time as the user updates their profile.

7.2 User Setup

The process by which a user can setup the system is very important. The setup process covers the following use cases:
  Joining the system with no Output Device
  Joining the system with a new Output Device purchase The process must be logical, intuitive, and simple. In some cases, the process defined follows the best practices of the mobile application world and the social networking world. In other cases, problems have to solved that are unique to the Output System 7.2 Utility Workflows To accomplish these use cases, it is convenient to define a series of utility workflows that can be strung together in various ways:
  Account Creation
  Profile Editing/Sharing/Discovery
  Printer Bluetooth Pairing
  Output Device Registration
  Output Device connection to Wi-Fi Network
  Expanding the user's personal network 7.2.1 Account Creation Workflow Every time the Phone App is run, the first screen will be a login screen. This screen will have a button to "Create a new account". Users can create an account whether they own a printer or not. The sequence is as follows:
  Enter User Name (name validated for uniqueness with Cloud Server)
  Enter Password twice (strength feedback)
  Enter Email Address twice
  Agree to terms of service/license
  Email Validation
  Email with link sent to user address
  User told to check their email
  Screen has an "Edit email address", and "Resend Email" option
  User checks email and clicks on link
  Server receives email and marks email as validated
  User notified that account is now functional
  User goes back to app and finds login screen. User Logs onto new Account
  App asks permission to do push notifications (explain why)
  App asks permission to use GPS during print (explain why)

App asks permission to use contact list (explain why)

7.2.2 Profile Editing Workflow

Profile editing allows the user to modify existing information associated with their account, and it also allows the user to add more information to their profile, thus enriching their system presence. During Profile Edit, the user is presented with a screen that offers several options:
- Change Photo
- Edit Summary Statement
- Edit Address
- Provide Facebook Login
- Provide Twitter Login
- Provide Instagram Login
- Inherit—which pulls profile information from FB, Instagram, or Twitter login is provided
- User Name for Printer
- Change Privacy policy

7.2.3 Printer Bluetooth Pairing Workflow

This workflow will pair the Output Device with the Smart Personal Device. This workflow is used when setting up a new Output Device, or it can be used for those rare occasions where the phone or the Output Device has lost pairing for one reason or another. Once the Output Device has been paired with the Smart Personal Device, the Output Device reports its status, which includes its MAC address and/or other data that uniquely identified this individual device. The Smart Personal Device can use this information for Output Device Registration with the Systems Cloud Services.
- App instructs user to press pairing button on the printer (flashing blue light on printer during pairing)
- App instructs user to go to the Smart Personal Device Setting menu for Bluetooth, and look for Output Device and pair using the special printer code (unique to that printer)
- This code could be a number labeled on the bottom of printer.
- This could be a QR code that is scanned with the camera before coming to the Settings screen
- The user then comes back to the app.
- App indicates printer is paired. Printer blue light is now solid indicating pairing
- App and printer does a refresh (via Bluetooth) which exports printer data (Printer ID—Mac address) and current status.
- App now shows power and media status.

7.2.4 Output Device Registration Workflow

All Output Devices must be registered with the Systems Cloud service before connection with that service is possible. Each Output Device will have a unique System identifier, which may be the devices MAC address, or some other arbitrary, but unique, code. This workflow is invoked when first setting up a printer, or restoring an Output Device registration that may have been removed for some reason.
- Is Printer Bluetooth Paired with Output Device?
- If No
  - Run "Bluetooth Pairing" workflow
- Else do a Bluetooth Refresh
- App registers the Output Device ID with the Cloud associating it with the user account.
- (This will also allow the Output Device to connect with the Cloud once Wi-Fi on the Output Device is setup)
- App tells user that printer in now registered.
- Run "Connect A Registered Output Device to a Wi-Fi Network" Workflow.

7.2.5 Connecting Output Device to a Wi-Fi Network Workflow

When an Output Device is being setup for the first time, or when the printer is taken to a new locale and the user wishes to connect to a new Wi-Fi network, this workflow is used to make that connection. Once connected, the printer can store the connection information for several Wi-Fi networks and connect automatically to them when it detects it is within their zones of operation.

The Output Device is designed to be a simple appliance with a minimal set of external controls. Its primary interface to the outside world is through its wireless interfaces. In the current embodiment, this consists of Bluetooth and Wi-Fi. Bluetooth pairing is relatively simple and straightforward, and can be accomplished using established best practices. The Wi-Fi setup is more involved and would be almost impossible to do without a more sophisticated user interface. The Current embodiment solves this problem by using the Smart Personal Device to provide the user interface, and an established Bluetooth connection to gain access to the Output Device. In this fashion, the Smart Personal Device guides the Output Devices internal setup procedure to allow the appropriate Wi-Fi network to be identified and connected to.

Once connected, the printer stores connection parameters so that in the future the Output Device can automatically connect to that Wi-Fi zone as it becomes available in the future. For example, when an Output Device is taken out mobile with user, the Output Device will reconnect when the device is once again brought home. In addition, the Output Device will transfer these connection parameters to the Smart Personal Device. Should the Output Device ever be reset or lose its internal connection parameters, they can be simply restored by the Smart Personal Device, creating a much more robust system for the user.

All Output Devices should be registered with the System's Cloud services prior to any connection with a Wi-Fi network. This is accomplished in the Output Device Registration Routine by the app using information obtained after Bluetooth pairing. Thus, the Output Device will be able to connect to the Systems Cloud service and be recognized and authenticated once the Wi-Fi connection has been established. The procedure for setting up a Wi-Fi connection is as follows:
- App tells user that they must be ready with the password for their intended Wi-Fi connection for the next step.
- App sends a command to Printer (via Bluetooth) to initialize Wi-Fi and search for networks to connect to. List of network seen is returned to app.
- App displays list of networks to user and asks them to choose network
- App asks user to enter Wi-Fi password for that network
- App sends network selection and password to Output Device.
- Printer connects to the network or sends failure message.
- If Connect—inform user
  - Store network configuration in printer (several connection records stored)
  - Store Back-up configuration in App (several connection records stored)
  - (If printer wakes up stupid one day, the process can be shortened once pairing is re-established)
- If Failure
  - Fail sent to App
  - App informs user
  - Allows user to redo network selection and password step Output Device connects with Cloud and does a refresh call to the Cloud Server Cloud notifies App that Printer is now on-line App asks "do you want to be findable?"—Answer recorded in profile App displays connection modes with screen cues (including strength of connection)

7.2.6 Expanding the User's Personal Network Workflow

The value of a network is related to the scale of the network. Therefore it is important to provide the user with means to grow and expand their personal network. Growing this network enhances the user's ability to have unique Social Network driven Output experiences. The growth of the network also is critical to meeting business objectives that leverage this growing scale.

This process focuses on three areas: 1) Finding existing members of Network to connect with, 2) Inviting friends and family to join the network so that you may connect with them, 3) Finding Celebrities and other Broadcast Printers that you wish to follow.

Internal searches can use information from user profiles, such as Name, User ID, email addresses, or the user ID from other Social Networks that users have added to their profiles.

External Invitations can be sent to friends and family whose contact information is directly provided by the user, or by accessing the contact list on the Smart Personal Device. Such invitations can set send via email, text message, or via one of the more common Social Networking systems. Messages contain invitation information and a link that allows the invitee to download the application to their Smart Personal Device and create an account. Once this has been done, the User is notified that the person they invited has joined the network, and the Follower connection is thus facilitated.

Broadcast Printers are already members of the system, and can therefore be found by search. However, another way supported is by browsing curated collections of such users. These are sorted by category such as: Popular, Trending, Music, Sports, Comedy, Politics, etc.

This workflow to allow the user to grow their network can be invoked at anytime and is focused on providing different methods to expand the user's personal network either by increasing the number of others you are following, or inviting others to follow you:

Search for Users to Follow
   Search User Profiles to find a person
   Choose search by Actual Name, system user name, Facebook user name, Instagram user name, or Twitter user name
   Profiles found have a "Follow" button
   Profiles can be viewed
   Group Search for User Profiles
   Screen allows searches by Phone contact list, FB, Twitter, and Instagram network search, or all of the above.
   Search finds all users that are either in your phone contact list, or members of FB, Instagram, or Twitter, AND have accounts on the system.
   List of User Profiles returned, each with a check box to "Follow"
   Invitation to Non-Members to Join (So Inviter can follow the invitee)
     Choose network to search: Phone Contacts, FB, Instagram, and Twitter
     Display list of names found that are NOT currently associated with the system—each with a select button. Continue button to proceed . . .
     Example email that will be sent is displayed with option to modify message. (Could be message sent directly on FB, Instagram or Twitter)
     Submit button→send email to distribution list with link that allows account to be created.
     Once created, notification sent to inviter asking if they still wish to follow this person.
Follow Recommendations
   Catalog of Celebrities or Commercial Broadcast Printers that can be followed
   Most Popular, Trending, By Category, Search, etc
Invite People to Follow You
   Search User Profiles to find a person
   Choose search by Actual Name, system user name, Facebook user name, Instagram user name, or Twitter user name
   Profiles found have a "Invite" button
   Profiles can be viewed
   Group Search for User Profiles
   Screen allows searches by Phone contact list, FB, Twitter, and Instagram network search, or all of the above.
   Search finds all users that are either in your phone contact list, or members of FB, Instagram, or Twitter, AND have accounts on the system.
   List of User Profiles returned, each with a check box to "Invite"
   Invitation to Non-Members to Join (So You can Follow Me—Print on my Printer)
     Choose network to search: Phone Contacts, FB, Instagram, and Twitter
     Display list of names found that are NOT currently associated with the system—each with a select button. Continue button to proceed . . .
     Example email that will be sent is displayed with option to modify message. (Could be message sent directly on FB, Instagram or Twitter)
     Submit button→send email to distribution list with link that allows account to be created.
     Once created, notification sent to inviter asking if they still wish to follow this person.

7.3 Joining the System with No Output Device

There are two kinds of users that are members of the system: 1) Users that own an Output Device, 2) Users that do not own an Output Device. Users need an Output Device to be followers, but non-printer owners can still join the system and be followed by others. This effectively allows them to be able print to other people's Output Devices. Joining the system is a simpler process as there is no hardware to configure or register:

Download App from Apple App Store
   Run App→Login Screen with "Create an Account" Button
   User presses Button
   Do "Account Creation" workflow
   Ask if they want to register an Output Device now
   User answers "No"
   Do "Expand your Network" workflow 7.4 Joining the System with a New Output Device A newly purchased Output Device must be setup to be used. This means installing the application on the new user's Smart Personal Device, creating an account with the system, registering the output Device and setting it up so that is connects to the system:

Download App from Apple App Store
   Run App→Login Screen with "Create an Account" Button
   User presses Button Do "Account Creation" workflow
Ask if they want to register a Output Device now
  User answers "Yes"
    App instructs user to unpack and prepare Output Devise
    Do "Printer Registration" workflow
    Do "Expand your Network" workflow 7.5 Already a System Member, Registering an Output Device In this case, a member of the system buys or otherwise obtains a new Output Device and chooses to register the device with the system:
Run App
Log-in
Go to Settings menu, select "register an Output Device"
App instructs user to unpack and prepare the Output Device.
Do "Output Device Registration" workflow 7.6 Connecting a Registered Printer to New Wi-Fi Connection Often the first and main Wi-Fi connection that will be established on an Output Device is the user's home Wi-Fi. This workflow allows the application to act as the user interface for the output device and sets up its Wi-Fi chip to connect to a local WI-Fi zone. The Output Device can support more than one Wi-Fi Zone. For example, there might be one setup at home and one at work. Perhaps the user wants to setup one in their hotel room while on vacation. The workflow to do this is as follows:
Plug in Printer and turn on
Run App
Log-in
Go to Settings menu, Select "Connect to a Wi-Fi Network"
Do "Connecting Printer to a Wi-Fi Network" workflow 7.7 Expanding Your Network This workflow allows the user to manage their personal network.
Run App
Log-in
Go to menu "Grow your network"
Do "Expand Your Network" Workflow 7.8 Publically Available Output Devices There may be times when members of the System might want to make an instant print, but they don't have their Output Device with them. This need can be filled by using a "Public Output Device". A Public Output Device is a one that is located in a public place and is available for use by anyone that is a member of the system. This could take on many forms.

It might consist of any supported printer, similar to what the user might normally own and carry. In this case it is assumed that someone is available to manage the device, loading it with media as necessary. For example, it might be located on a counter in a coffee shop.

It could also consist of a specially designed printer that holds a much larger media supply. This would also need to be managed by local personnel.

Another form would be that of a standalone vending machine. This would provide for a secure environment for the printer, and could be managed by a service that periodically would visit the vending machine, loading it with media, and doing routine maintenance. Charges for using this device might be covered by the System billing your account, or it could be coin or credit card operated.

In some cases, printing from Public Devices might be free if it was tied to a branding play. For example, Starbucks could decide to offer free printing for their all of their patrons, and the resulting print might have branding information, promotional material, or coupons attached to the printed image. Alternatively they could offer the free service to those who had a loyalty card.

In any of these cases, the Output Device location would be prominently marked so as to be easily found. Further, each Public Output Device would be registered as such with the System. As part of this registration process. The location of the device would be captured, as well as the person or entity responsible for it operation.

Output Device Status would be reported back to the System periodically, and alerts would be directed to the responsible person when the media supply is low, or when an error condition exists that must be dealt with.

In addition, the user could use the application on their Smart Personal Device to search for the nearest Public Output Device. This search would be aided by leveraging GPS locations of the user to identify the closest Public Output Device (leveraging its registered location) and provide instructions for finding it.

To send an output to the device, the Application on the Smart Personal Device would use the camera to capture an image of a prominently displayed barcode or QR code. This would be decoded and translated to identify the printer in question. Once identified, the application would enable content to be sent to it. The application would notify the user what the charges were associated with sending content to this Output Device. It would also support several ways to pay these charges electronically. The preferred method would be to have a charging system already configured so as to enable a one-click output experience.

An Output Request would be sent to the identified Output Device. If the Output Device reported success to the system, the user would be charged for that output. If the Output Device failed to create the desired output, no charge would be made.

8.0 Fundamental High Level System Flows

With this background we can now begin to examine simplified but fundamental high level flows of the system.

8.1 Broadcast Printing Flows

Figure 9:
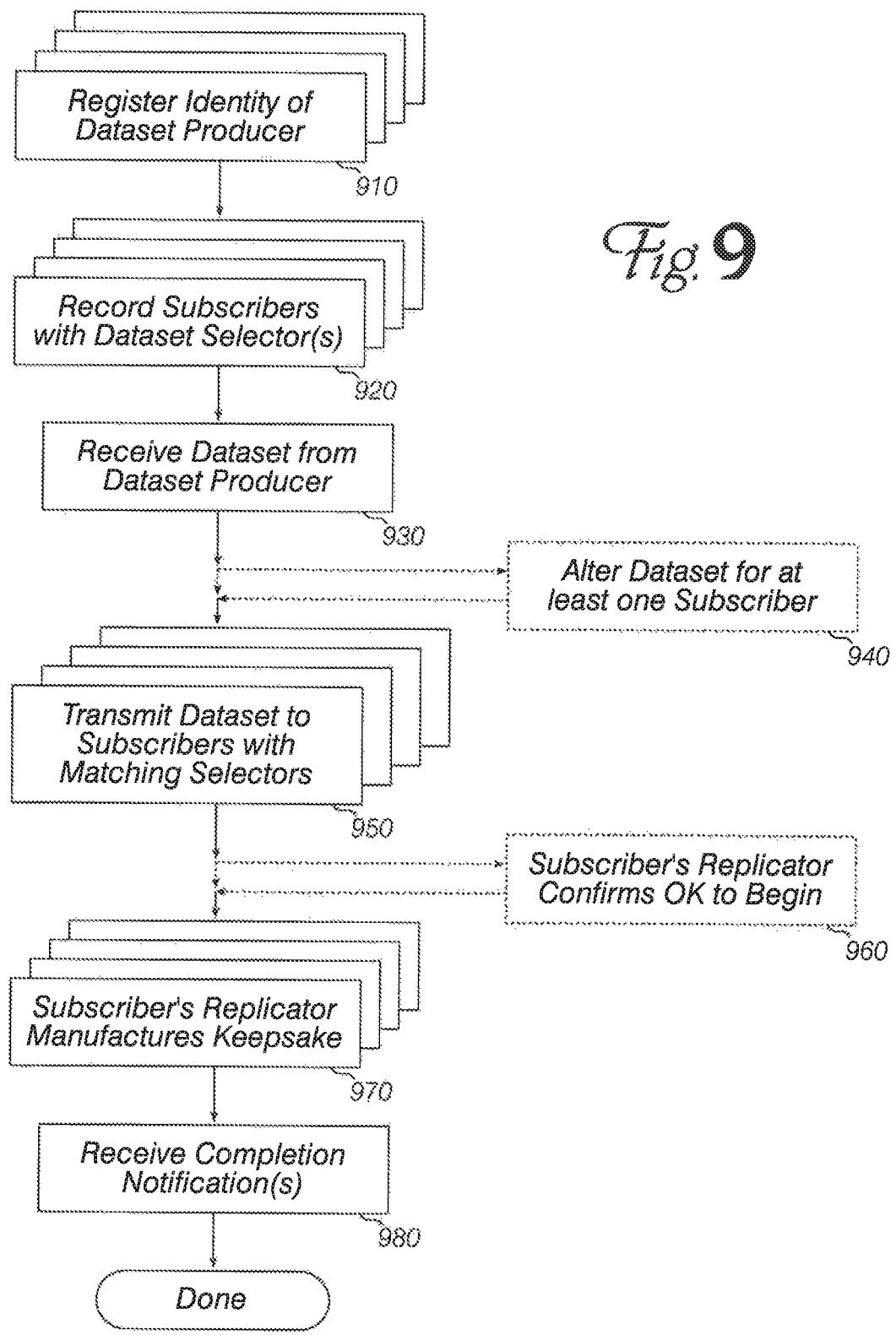
FIG. 9 shows a network flow chart for controlling the process of Broadcast Fabrication of Keepsakes from the Cloud Services point of view.

For the Socially Networked Distributed Printing System to work, certain information must be registered. First the Producers of Data Sets must have an account registered with the system (FIG. 9, Item 910). Secondly, other users of the system, who are also pre-registered with the system, must "Follow" or subscribe to a Dataset Producer. This causes a list of "Followers" to be recorded by a Data Selector within the system (FIG. 9, item 920). This supports the use case where a Dataset Producer want to share a dataset with "all of his followers". Being able to do this simplifies the work that the Producer must do when acting to share. In this case, the system will take care of creating the distribution list.

The Dataset Producer can send new content to the System for distribution to the System (FIG. 9, item 930), where said content is at the highest resolution available. The system will prepare this master dataset for distribution by processing the Dataset for at least one Subscriber (FIG. 9, item 940) based upon the specific replicator that Subscriber owns and its output characteristics.

For example, in a printing based system, the dataset may consist of a high-resolution image. The system will have to consider the type of printers that are used by each subscriber, and render a version of the image that has just enough resolution to minimize the size of the transferred file and yet maximize the output of the printer.

For example, a 2×3 inch 300 dpi printer would require a smaller image than a 4×6 inch 300 dpi printer. If the total subscribers had three different resolution printers the system would create three different versions of the image file to send to each type of printer. Sending the original version of the Dataset is typically inefficient. Often there will be significantly more data than can be used by the Replicator. This is true in photographic printing, and likely to be true in other forms of replication. It is best if the dataset sent is sized appropriately for the capability of the replicator. If there were only a single subscriber, at least one file would have to be so rendered.

At this point the system would transfer the correct Dataset to each Subscriber (FIG. 8, item 950). Once the Subscriber has approved the creation of output (FIG. 9, item 960), the associated replicator would then manufacture the Keepsake. (FIG. 9, item 970). At this point the Replicator can notify the system that its task is complete (FIG. 9, item 980).

8.2 Keepsake Fabrication Flows

Figure 7:
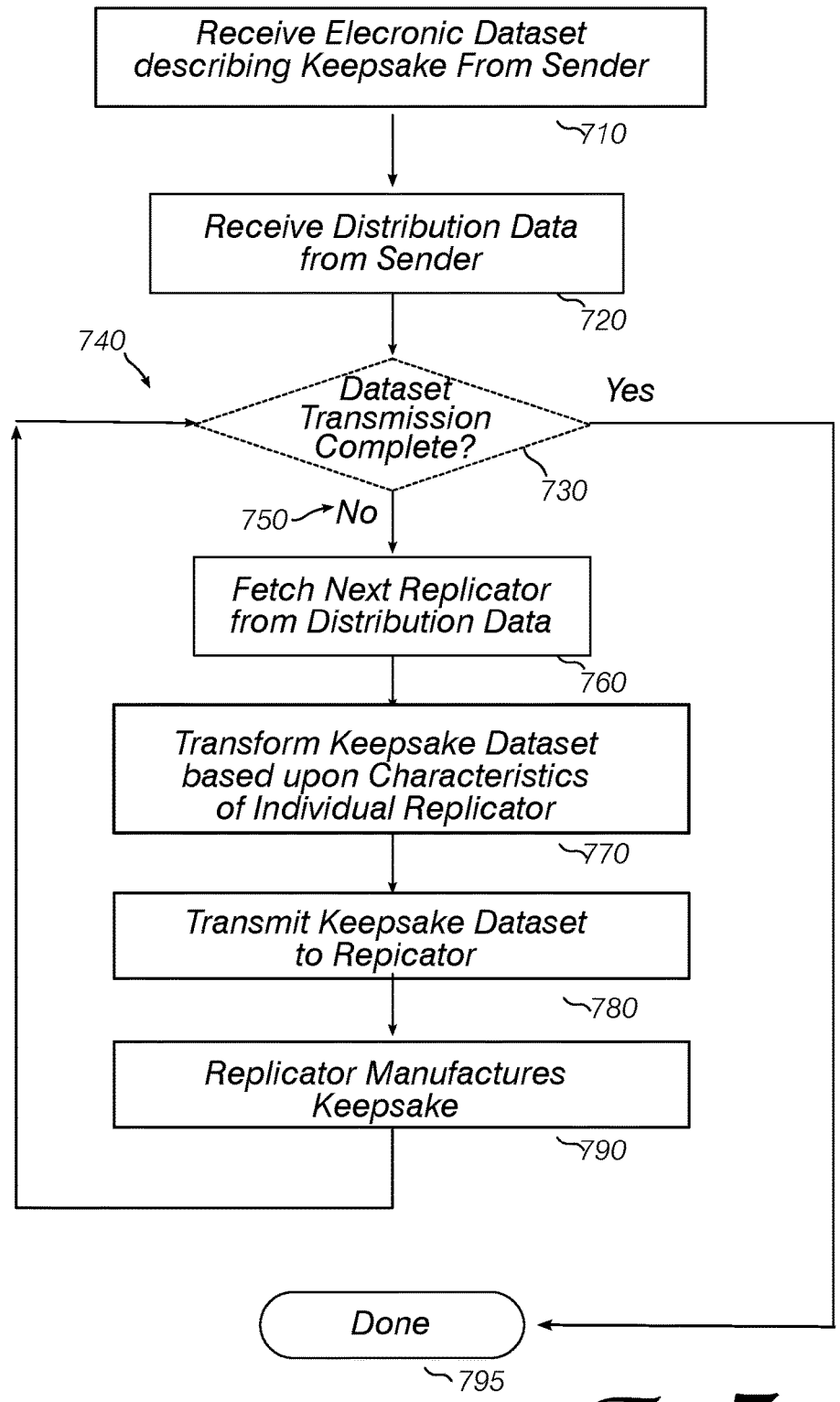
FIG. 7 shows a flow chart for the distributed manufacturer of a Keepsake.

In other cases, the Dataset Producer can target a subgroup of followers to receive the data set. In this case, the Dataset is sent to the system by the Dataset Producer (FIG. 7, item 710) along with distribution data (FIG. 7, item 720). These are two distinct data sets. Once is associated with the item that is to be replicated. The other provides routing information for the system. The system would process the distribution list within a logic loop that would continue as long as there are more entries in the distribution data (FIG. 7, item 730). While there are additional entries to process, the system would fetch the next Replicator address from the distribution data (FIG. 7, item 760), lookup the characteristics for that Replicator, and transform the dataset for that specific replication device (FIG. 7, item 770). At this point, the transformed Dataset can be transmitted to the Replicator (FIG. 7, item 780) and the Keepsake can be Replicated (FIG. 7, item 790). This process will continue until all designated Replicators listed in the distribution data have been dealt with.

To those skilled in the art, it will be clear that other forms of logic could be applied to accomplish the task so described. The principal feature of this logic being that Dataset sent to various replicators will be different, based upon a rendering process that customizes the dataset to capabilities of the Replicator. While each dataset sent to the Replicator may be different, the goal is always to create a Keepsake, whose ultimate form is comparable across Replicators with existing differences minimized. The Differences are thereby designed to be a fundamental part of the Dataset, done in a way that preserves the basic features of the Keepsake while adapting to the differences in capabilities of various Replicators. Note that Distribution data is entirely considered separate to the dataset. This is key when considering current art mechanisms such as Fax Blasters, where changes in the transmitted dataset often consist of a change in the Fax header line. Such changes really deal with routing and have nothing to do with the content dataset. In the Preferred embodiment, routing information and Keepsake Dataset are kept strictly separate and any differences in the delivered Keepsake Dataset are the result of Replicator capability and processing to minimize the size of the Dataset in a way that minimizes the impact on the perceived form of the final Keepsake produced.

8.3 Output Device Flows

Figure 10:
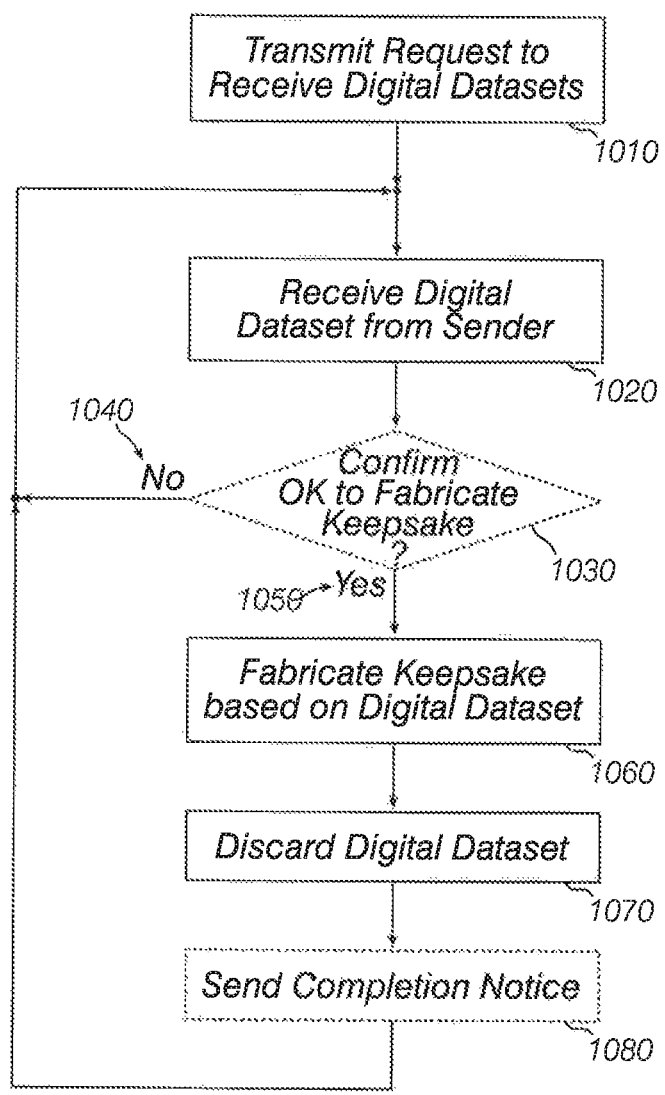
FIG. 10 shows s flow chart for fabricating a Keepsake from the Output Device's point of view.
Figure 11:
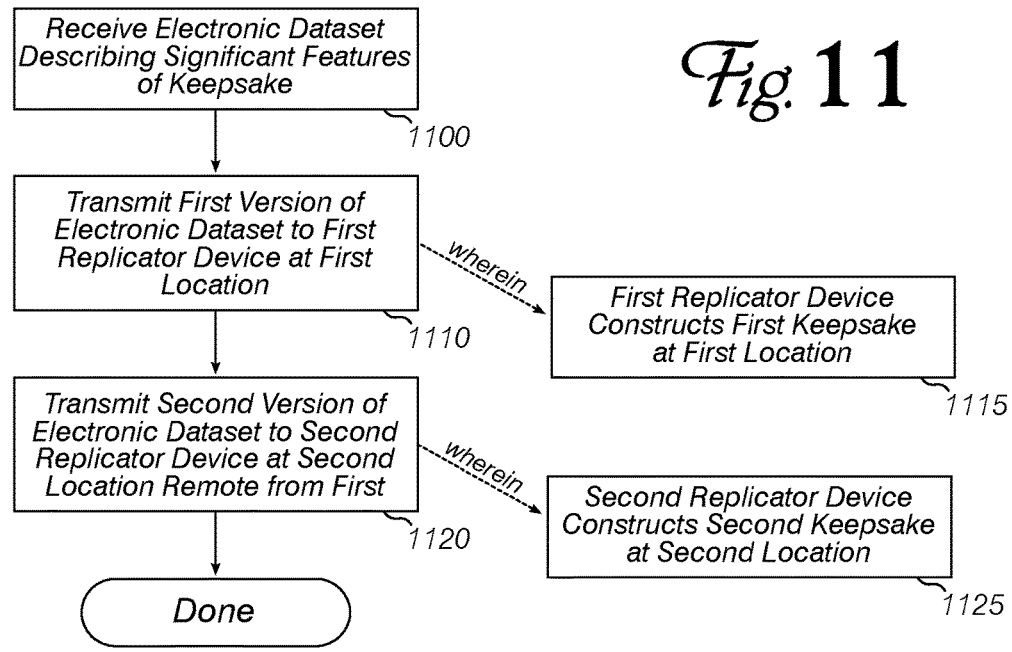
FIG. 11 is a flow chart showing a method according to an embodiment of the invention.
Figure 12:
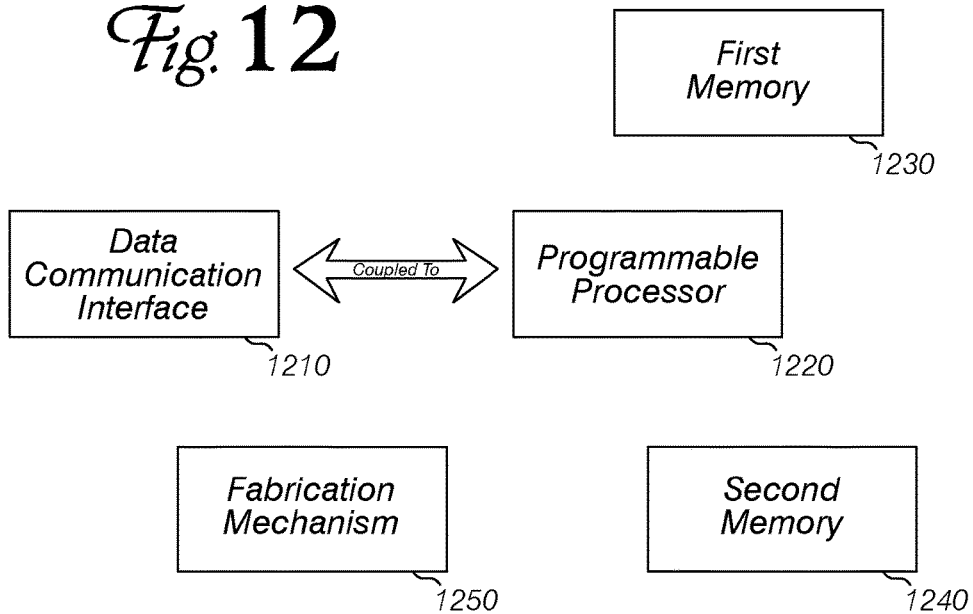
FIG. 12 shows components of a system according to an embodiment of the invention.
Figure 13:
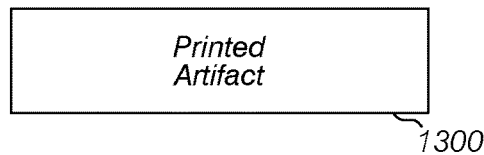
FIG. 13 shows the output of an embodiment of the invention.
Figure 14:
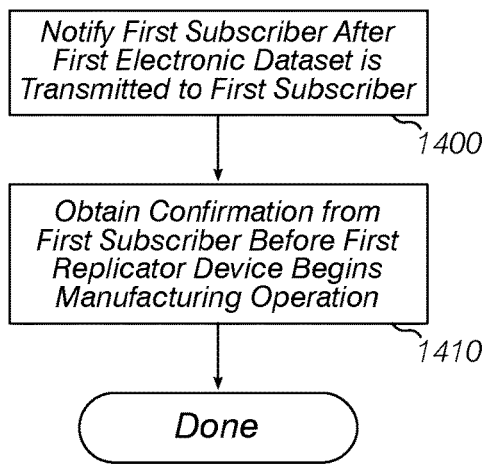
FIG. 14 is a flow chart showing a portion of a method performed by an embodiment of the invention.
Figure 15:
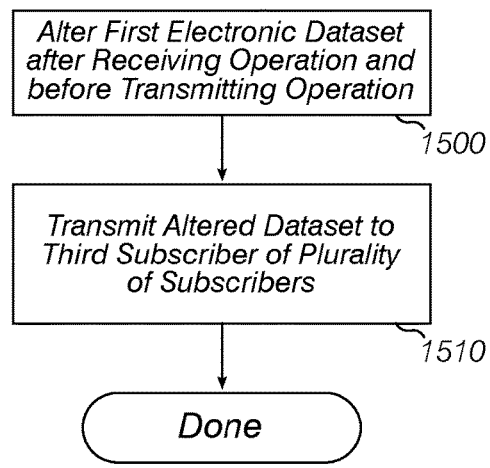
FIG. 15 is a flow chart showing a portion of a method performed by an embodiment of the invention.
Figure 16:
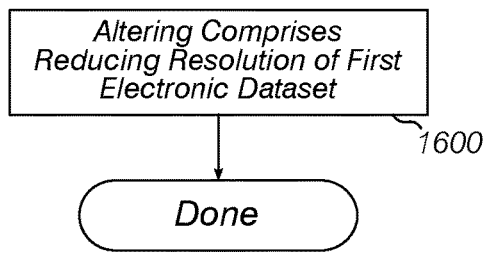
FIG. 16 is a flow chart showing a portion of a method performed by an embodiment of the invention.
Figure 17:
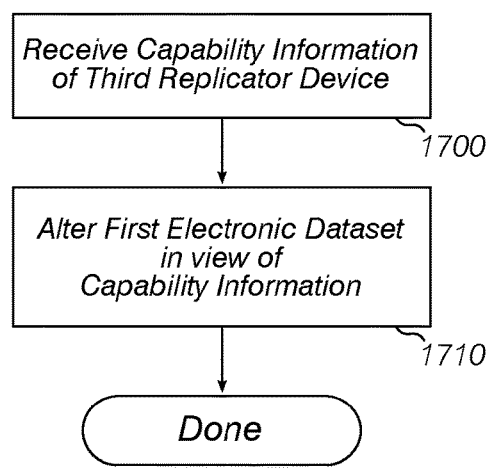
FIG. 17 is a flow chart showing a portion of a method performed by an embodiment of the invention.
Figure 22:
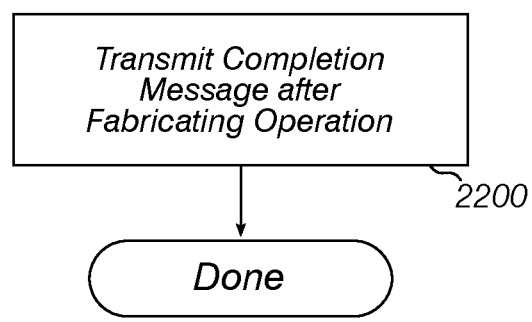
FIG. 22 is a flow chart showing a portion of a method performed by an embodiment of the invention.

Next, let us consider workflow from Printer or Replicator's point of view. In the preferred embodiment, the Replicator connects to the system to check if there is any content that has been directed towards it (FIG. 10, item 1010). If there is, it then downloads the Dataset (FIG. 10, item 1020) and then checks to see if it has approval to fabricate the Keepsake (FIG. 10, item 1030). If there is approval (FIG. 10, item 1050), then the Replicator creates the Keepsake (FIG. 10, item 1060), discards the dataset (FIG. 10, item 1070) and then finally sends a notification that the task is complete (FIG. 10, item 1080). While there are variations on how this logic can be carried out, the key features are checking for designated content, acquiring said content, checking for approval to replicate, replication, and followed by dataset deletion and job status notification.

9.0 Implementing the Use Cases

In the next section, we can explore how the primary use cases are supported by the design of the System.

9.1 Remote Personal Printing: Data Flow Through the System

Given that the user has already setup his system, it is then ready to support Remote Personal Printing. In this Scenario, the Output Device is left at home, plugged in and powered by home AC. It is connected to the home Wi-Fi Zone. The user is away from home, with his Smart Personal Device in his possession.

At any point the user can decided to print something to his printer. He launches the application on his Smart Personal Device (FIG. 6 Item 610), and looks at the images stored on that device. He chooses one for printing. The application offers him the opportunity to crop or edit the image, select bordered or borderless printing, the option to add a caption and the option to Auto-post. The user makes his choices and decides to auto-post to Facebook with a comment.

The user then tells the application to proceed. For the current embodiment, this consists of taking an image to be printed and downsizing the image to the appropriate print resolution for the desired output device and packaging that image as a JPEG image with modest compression levels. In addition, EXIF data fields are updated by copying some information from the original image, and creating new data appropriate for the print resolution image. This process is well understood by those knowledgeable in the art.

Other forms of output would require different processing to create the appropriate Output Pattern File.

The application inserts the print resolution image into an output queue and locks it there until output is successful. The Application then forms an output request and connects to the Cloud Client API (FIG. 6, Item 630) via the Clients Internet connection (FIG. 6, item 660) and transfers the print request. The Cloud Client API then stores the Output Request in Temp Storage (FIG. 6, item 646), and creates a Notification via the Notification API (FIG. 6, item 635).

Figure 6:
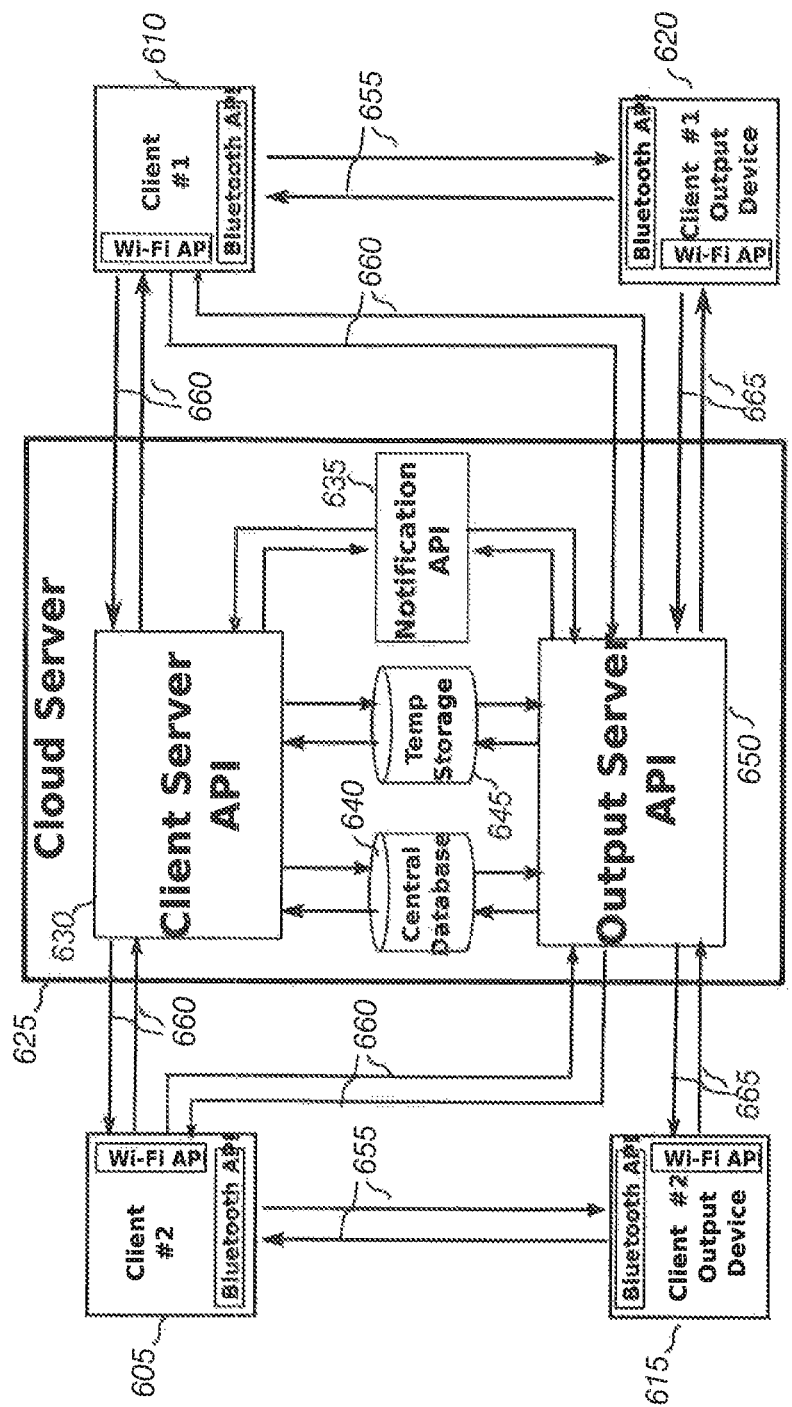
FIG. 6 shows a diagram of the high level architectural design the Socially Network Distributed Printing System.

The Output Device (FIG. 6, item 620) periodically polls the Cloud Output Server API (FIG. 6, item 650) via its Wi-Fi Connection (FIG. 6, item 665). This polling is often necessary as the Output Device can get through firewalls, whereas the Cloud Service cannot. As part of this polling, the Output Device sends it current status.

The Cloud Service accepts this status update and sends it to the Notification API so that the Client will be apprised of the current state of the Output Device.

Another part of this polling is checking to see if there are Output Requests that need to be processed. If there is, the Output Device will download the Output Request and then send the image to the internal print engine. Once the image has been successfully printed, a "success" message is sent to the Cloud Output Server. The Cloud Output Server deletes the Output Request from Temporary Storage, and then sends "Success" flag to the Client. The Client receives this notification, and releases the print request from the Output Queue.

If the Output Server does not receive a poll from the Output Device within a specified amount of time or is unable to transfer the Print Request to the Output Device after a pre-defined number of tries, it will delete the print request from Temp Storage, and send a notification of failure to the Client. The Client may wait a period of time and then re-attempt the sending the print request using the request that is locked in the output queue. This will continue until success or if this fails for after a predefined number of attempts, it will notify the user of the problem.

Should the failure be due to the fact that there is a condition that must be resolved by the user directly, (for example, to clear a paper jam or reload media), the Client will attempt to print the image after the problem is resolved by leveraging the Bluetooth connection in a fashion described in the Mobile Instant Personal Printing description.

If the image is printed successfully, the Client application will then generate a Facebook posting as requested and submit that posting to Facebook using the appropriate Facebook API.

9.2 Mobile Instant Personal Printing: Data Flow Through the System

The sequence in this scenario is identical to Remote Personal Printing scenario up to the point where the Output Request is locked into the Output Queue.

In the case where the Output Device is mobile, the Client application will ping the Output Device via the Bluetooth connection (FIG. 6, item 655) to check to see if the device is powered up or in sleep mode. If awake, the Output Device will reply and update its current status (Client will pass this Status along to the Could Client API via the Internet connection). If necessary, the Client will prompt the user to activate the Output Device. At that point the Client pushes the Output Request to the Output Device via the Bluetooth connection. The output Device will then print the Output Request and signal success at the end or reply with an error state.

If the output is successful, the Output Request is purged from the Output Queue and any Auto-postings will be processed via the internet connection.

If the output fails, the user will be notified and a retry may be attempted.

9.3 Third Party Social Network Output: Data Flow Through the system

Given that a user has setup his software and account, that user can be followed.

Given that another user has already setup his software and account and they have set up and registered their Output Device, they can become followers, choosing people to follow.

With this in place, the person being followed can now submit an Output Request to his followers. He can select one of his followers, all of his followers, or choose a Sharing Group that is either pre-defined by the user or constructed on the spot.

He launches the application on his Smart Personal Device (FIG. 6 Item 610), and looks at the images stored on that device. He chooses one for sharing. The application offers him the opportunity to crop or edit the image, select bordered or borderless printing, the option to add a caption and the option to Auto-post. The user makes his choices and decides to auto-post to Facebook with a comment. The user then chooses who to share the content with.

The user then tells the application to proceed. For the current embodiment, this consists of taking an image to be printed and downsizing the image to the appropriate print resolution for the desired output device and packaging that image as a JPEG image with modest compression levels. Then a thumbnail image is computed. In addition, EXIF data fields are updated by copying some information from the original image, and creating new data appropriate for the image resolution image for both files. This process is well understood by those knowledgeable in the art.

Other forms of output would require different processing to create the appropriate Output Pattern File.

The application inserts the print resolution image into an output queue and locks it there until output is successful. The Application then forms an Output Request and Connects to the Cloud Client API (FIG. 6, Item 630) via the Client's Internet connection (FIG. 6, item 660) and transfers the Output Request. The Cloud Client API stores the Output Request in Temp Storage (FIG. 6, item 645), and creates a Notification via the Notification API (FIG. 6, item 635) for all users targeted to receive the image. This notification includes the thumbnail image, who sent the image, and when the image was sent.

The Follower Client (FIG. 6, item 605) receives the Notification via the internet connection (FIG. 6, item 660), and prompts the user for a how to handle it: they can Print the image, Save the image, or Delete the image.

If the decision is made to save the image, the Follower Client application connects with the Output Server (FIG. 6, item 650) via the internet connection (FIG. 6, item 660) to download the Output Resolution Pattern File. Once the image is successful downloaded, the Follower Client application saves the image on the device image store. If the Cloud has successfully transferred all of the images to all of the recipients, it purges the print request from Temp Storage and notifies the original user of success and the Users client can purge the request from its internal Output Queue.

If the User decides to delete the message, the user indicates this to the Cloud Server and then counts this request as delivered.

If the decision is made to print the request, what happens next is dependent upon whether the Follower's Output Device (FIG. 6, item 615) is connected via the Wi-Fi connection (FIG. 6, item 665) or connected via the Bluetooth connections (FIG. 6, item 655). If it is connected via the Wi-Fi, then output proceeds as described in the Remote Personal Output Scenario. If it is connected via Bluetooth, then printing is completed as defined in Mobile Instant Personal Printing Scenario.

When all requests have been delivered, the original sharer is notified and the image is cleared from the Output Queue on his Client (FIG. 6, item 610). The sharer is not told what the receiver did with that image.

9.4 Scalable Broadcast Output: Data Flow through the System

In many ways this scenario is very similar to Third Party Social Network Output, but occurs with networks of much greater scale.

The Broadcast Output user selects content is a way that identical to the other scenarios just described. The Output Request is created and transferred to the Cloud Client Server. Nominally, the same methods are used to propagate the Output Request through the system and deliver it to the Followers' Network.

The scale of the operation does present some unique challenges that the system must be able to deal with. Typically, the scale of the Social Network for the average use is small. An image is shared with family and friends, and such transactions rarely involve large number, ranging in scale from one to perhaps twenty. A Broadcast Output user deals with networks that range from thousands to millions. Celebrities can have global followings that are immense. Sharing an image through the network can have a significant impact because of the "bursty" nature of such transactions. Cloud services are scaled to handle the typical average loads encountered with sufficient residual handling capability to deal with the occasional spikes in loads. A single broadcast output request could flood the system with significant additional load. There could be millions of notifications to deal with, as well as content transfer loads for each of the followers to obtain the Output Pattern File so that distributed output can occur. Added to this is the fact that there can be many Broadcast Printers operating at once.

Social Network sharing can fall into a broad continuum, ranging from the very small numbers of the typical user sharing with a small group, to Broadcast Output users that can have networks that vary wildly in scale. The System must have mechanisms for dealing with these increased loads as they occur.

Some of these mechanisms are generic in nature and are typically built into Cloud Server systems to be adaptive and resilient under loads. Load balancers, and dynamic Server scaling are known to those skilled in the art. However, given the specific nature of Broadcast Output Requests, it is possible to devise specific strategies for dealing with the loading they cause. In a sense, the System is creating its own loads by taking an Output Request and broadcasting them. Since the system is doing this to itself, so to speak, there is no reason that the system cannot purposefully modify how it accomplished this to make the situation more manageable.

One approach to dealing this is to change the method of propagation based upon the scale of request. Scale thresholds are established that when crossed, cause the system to adapt or change the algorithms used for implementing the request.

For example, Broadcast Output Requests that range from two to thirty followers, might be handled in the normal fashion which is the base design of the system. Output Requests are Stored on the Smart Personal Device Output Queue and retries are driven from the Smart Personal Devices application software. The Cloud Service will cache the request in its Temp Storage for a small amount of time while transfer attempts are made but if these attempts are not completed in within this short period of time, a "failure" message will be returned to the Smart Personal Device and it will be up to that Device to initiate additional attempts.

For requests that range from thirty-one to five hundred, the system no longer depends on the Smart Personal Device. The Output Request is moved into the Cloud Services Temp Storage and keeps it there until the all transfers have been accomplished. However, the remainder of the process remains unchanged.

From the scale of 500 to 250,000, the System will change from its normal methods of handling requests to one that stages the release of notifications over time to prevent instantaneous loads from overwhelming the system. For example, notifications could go out to the first 10% of the targets followers, and the next batch could be released after a time delay. This acts to spread the load over time without delaying the delivery of content is a significant way.

From scales larger than 250,000, the system could transfer the request from the normal servers to servers that are dedicated to handling the additional load that Broadcast Output place on the system.

In actual practice, the threshold levels may be set to different values, and the method used at various level my also change. The important aspect here is the concept that the system performance is adaptive to the scale of the request, and changes in system behavior are designed to minimize the impact of such requests and prevent them from negatively impacting the normal behavior of the system to handle typical user sharing requests.

Another way that Large Scale Broadcasting Output events are different is in how status reporting is done with the user who shared the content. For small scale situations, it is often sufficient to notify the user that the Output Request has completed successfully. For large scale Broadcast Output, this becomes more involved. If there were a million users in a sharing group, the entire request will play out over time, with the distant possibility that some people would not receive the request for one reason or another. In this case, it make more sense for the user to get periodic status reports that indicated how many Output Requests were delivered, how many were yet to be delivered, and whether the process was ongoing or completed.

9.5 Invitation Output: Data Flow Through the System

The Invitation Output case differs only in how the output activity is initiated. After initiation, the Output Request generation is handled in ways that are identical to the Third Party Social Network Output use case and the Scalable Output Broadcast use case.

A follower initiates an invitation for output by doing three things. First, they must define the nature of the output they are seeking Secondly, they must identify which of the people they are following to invite. Lastly, that must send the invitations.

The user can define the nature of what they are looking for by using descriptive language that will be included within the invitation. They can also be more precise, identifying specific metadata attributes that the receiver of the invitation could use to automatically search for suitable content. This metadata could include times, dates, GPS locations or any other data that is commonly supported by image capture systems today or in the future.

Selecting the people to invite can be done by manually listing specific people that are followed, deciding to send the invitation to all of the people being followed, or viewing a scrolling list of those being followed and clicking on the those to be included in the invitation. Sharing Groups can also be defined and used.

The invitations can be sent via an internal messaging capability, but it could also be sent using any external communication vehicles such as email, Text Messaging, or Social Media site postings.

10.0 Print Metadata

It is becoming quite common for cameras to collect metadata around a picture taking situation and encoding and storing that information with the image file, typically as an EXIF data field in a JPEG image file. At first this information consisted primarily of the date and time of the image capture, and information related to the settings of the capture. With the advent of Smartphone and their ever increasing camera capabilities, we are seeing more sophisticated metadata being captured. With compute power of the Smartphone, faces are being detected and located within the frame, and in some cases even identified. Given that Smartphones now typically have GPS receivers, we are now seeing detailed location information being stored with the image.

Historically, there have been some limited forms of metadata associated with a hardcopy print. Traditional photofinishing operations in the latter half of the twentieth century often printed the month and year that the print was made on the edge of the print. Some optical film printers would also print neutral and color corrections used to make the print on the back of the print so that reprints, when requested, would look the same.

However the rich contextual data associated with camera image capture has typically not been done when a print is made. There are several reasons for this. When the printer is just a home printer, printing becomes an event after that the fact. Users capture an image during a life event, and if they print at all, the actual printing is far removed in time and place from the original event. In general, the context of printing in this fashion is not emotionally relevant.

This begins to change when you have a small mobile printer. You can take the printer with you as you live through life's events, and the printer will allow "instant prints" to be made from images taken in near real-time. This dramatically changes the dynamics of an event. "Instant prints" made during a life event suddenly becomes an integral part of the fun of the event. People gather around to see the images, just taken, as they come off the printer. Everyone wants one. Friends are posing funny ways to take a photo that they can print right away. The mobile printer becomes a form of social lubricant for enhancing the event. It becomes a catalyst for the moment, part of the action, the center of fun.

Given this change in context, metadata around mobile printing becomes more important. Given that the printer is driven by a Smart Personal Device, a rich set of metadata could be collected from that source. Time and Date of printing is known, as is the location from the GPS. GPS coordinates can be looked up using web services such a 4square to come up with a named place. Faces in the images printed can be detected and recognized. Personal Calendars can be referenced to identify the nature of events with based upon their date and time. This constitutes a rich set of metadata around the printing situation.

Metadata from prints made in the middle of an event may coincide closely with camera metadata because printing is done very close to the time of capture. However, metadata from prints made two weeks after an event—made when reliving an event with friends—would tend to look very different.

How and why would one use such print metadata information? There are two primary areas: Consumer Behavior Analysis, and Enhancing Social Context.

In the first case, we can better measure and understand the behaviors and motivations of the user. For the first time they have a printer that can be mobile. Are they using it that way? How often are they printing in a mobile context? Where are they using it? How many prints are made while they are at that location? What kind of place did they print at? Answers to these kinds of questions allow the printer products and supporting systems to be optimized based upon their actual use patterns. Since this information is collected in real-time and reported as part of the user informational asset pool associated with their user account, the data is also timely. This kind of data is extremely valuable to designers of system and printers supporting mobile applications.

In the second case, we have an opportunity to add Social Context to the prints being made. Perhaps this takes the form of a caption or text printed on the border of a print. For example:

"Printed at Friday's Restaurant on Friday, February 21, 2014 at 9 pm"
"Print fun with Judy, Susan, and Janet at Janet's Home, 2/21/14 12:30 pm"
"Printed and Brian and Jill's Wedding, 6/20/14 at 7 pm"

"Instant" prints made with a mobile printer can become a treasured keepsake that reminds one of the fun and shared nature of special moments. Enhancing the context of those images by using print metadata simply enhances their value. Clearly the kind of information is more detailed, contextual, and useful than print metadata from the past.

For business purposes, a log of key metadata associated with printing events can be maintained by the Smart Personal Device and periodically transferred to the Cloud for storage indexed to the users account. Here it can be used for further analysis.

Since the print metadata is collected and stored initially by the Smart Personal Device, it is possible to create a user view of this print log. Print events can be shown as a scrolling list of thumbnails images, sorted by printing date or even by printer location. Once selected, the user can view the metadata associated with this event. This metadata display could be as simple as a list of labeled numeric data, or it could be a richer display, where maps show GPS locations, and calendars show dates, etc.

It is also possible to create a link on the physical print that would allow for a tie-back to the digital record of the metadata. For example, information could be stored on the print that would allow access to that information. For example, a machine-readable mark such as a barcode or QR Code could be printed on the back of the print, or elsewhere on other sorts of keepsake objects. When scanned by the Smart Personal Device's camera, it would be decoded into a link that allows the desired data to be displayed. One can imagine many ways this link could be encoded onto the print.

Another way is through the use of invisible watermarking technology. With this approach, marker data is hidden in the noise of the image. It is not visible to the eye of the observer, however a captured image of that print (by a scanner or camera) would allow the use of a decoding algorithm to extract the buried data and use it to index to the desired information.

Finally this information could be used when a print is also auto-posted to social media. In this case, the print metadata could be posted as tags or constructed comments that are included with the posting.

11. The Design of Mobile Output Devices and Innovated Applications

The system, combined with some innovation printer designs, enabled new output Experiences.

11.1 Live Printing While Mobile

In the current output paradigm, printers are large complex devices that are statically located in one strategic location. A small, light and portable printer powered by batteries and wirelessly connected changes this paradigm. Suddenly it is possible to take your printer with you and print whenever and where ever you want.

Printing could be stimulated by images just captured, or the desire to print an existing image "instantly" so that it may be given to a friend you are meeting with. Alternatively, print requests from people you are following could also be made, as the Smart Personal Device is still connected to the internet and can receive such request, and print them to the Output Device via the local Bluetooth connection.

In some cases this might mean taking your printer out of your backpack, briefcase or purse, turning it on, and then printing. However, the preferred case is where a printer is always on and can be printed to from where it is stored and carried.

To support this, the Mobile Output Device would be designed to be power efficient with compact rechargeable power sources and wireless communications that work over short distances with optimized power usage profiles. The printer would be able to make portions of its system dormant to minimize power drain while keeping other portions of its system awake and able to respond to commands sent to it via its wireless channel.

The printer should be designed so that it can print in any orientation without jamming so that the printer could literally be functional as carried in a random orientation within a backpack or purse. Printers tend to eject printed material so the printer would have to be designed to prevent jamming or print damage as it leaves the printer. This might best be accomplished by having an internal storage area where printed content is captured. For example, media supply area will reduce in size as media is consumed in the printing process. A printer could be designed so that printed material is captured and stored in the space that is freed up due to media consumption. Another method would be to design a printer carrying case that protects the printer and establishes a clear jam-free zone for printed material to exit the printer and be stored until needed by the user.

These concepts allow a printer to be deigned that can be continuously active and functional even when carried around in a cluttered bag, backpack, briefcase, or purse.

11.2. Mobile Printing of Proximity Relevant Promotional Materials

The concept of a mobile, always "on" output device combined with the resources of the Smart Personal Device enable unique and specialized functional, advertising, and promotional output opportunities.

Given that the Smart Personal Device knows its location at any given moment, it would be possible to identify output opportunities that are unique to that location. Proximity based printing could be context specific, and in all cases, is designed to meet the user's needs in a convenient way.

This concept can best be explored by considering of number of possible examples.

If the printer were carried into an airport, the user could be asked if they want to print their boarding passes, avoiding lines at check-in counters or kiosk.

If it were getting close to Lunchtime, the user might receive a notification that a local restaurant was running a lunch special and a discount coupon was available for printing.

The user is nearing a movie theater where they have bought on-line tickets. The user is prompted to print movie passes so they will be available for entry.

The user is in a mall, and receives a notification for a $5 rebate on their next purchase for a local retailer. They can print that rebate.

The number of possibilities for proximity-based printing is large, and can support many different forms of functional and promotional applications.

These examples consist of the proximity with a location driving the nature of the print opportunity. However, proximity could be used in another fashion. If your printer were running low on media, the system could suggest locations in your proximity where additional media could be purchased and provide a coupon for that purchase. In this case a specific need, in combination with proximity, drove the printed promotional items.

11.3 Roll-Fed Output Devices and Variable Aspect Ratio Output

Many output devices use media that consists of cut sheets of a fixed size that are stacked in media supply bin. Another possibility is designing an Output Device whose media supply comes in the form of roll. The roll is passed across the print heads and when the print is done, a cutting mechanism would cut the paper to a desired print size length.

Since the length of the print is based upon how much paper is fed across the print heads, such a system could be used to create output that has variable aspect ratios. The printer would communicate its output capabilities when communicating with the System, allowing the System to take advantage of this capability. There are many ways of taking advantage of this capability.

One way would be to support high aspect ratio printing for panoramic images. Smartphone cameras are finding new and better ways to allow users to capture ultra wide angle images that offer greater visual perspective in a panoramic shot. However these images are often difficult to view on small fixed-ratio screens and there are very few ways of generating output that does not waste media. However, the roll-fed printed could create prints of arbitrary length providing the ability to create stunning output images.

Another use would be to print standard sized images with new areas spliced on one or both ends of the image. These new sections could be used to add graphics, print captions and comments, and support the output of rich contextual print and image metadata. This ability to customize the format of the print and add additional information could be leveraged by Broadcast printers to make their shared images stand out. For example, broadcast print images form sports team could have their team logo printed on the side of the print, along with additional messages they wished to convey. This capability could also be used to print ads, coupons, tickets, coupon codes, and anything else that could have application in the market place.

11.4 Output Device Status

Every time the Output Device communicates with the Cloud via the Wi-Fi Connection, or the Smart Personal Device via the Bluetooth Connection, it also uploads the current Output Device status. This information is propagated between the Cloud and the Smart Personal Device so that it is kept in sync. It is also displayed to the user.

This information includes the identity of the device, model number, Output Capability, and the version of firmware.

It also reports its consumables: which power source it is using (battery or wall socket), and the state of the charge state of the battery, and how much media it has available to support print requests.

It tracks the number of prints made on the device during its life, and the log of errors it has encountered since the last update.

The type of connection currently in use is reported: Is it static and remote, connected via Wi-Fi, or is it Mobile and dynamic, connected via Bluetooth?

It is also possible to determine the location of the Output Device and store this information with the printer status. In the case of a Mobile Output, the location can be captured from the GPS of the Smart Personal Device, and is dynamic in nature. In the Remote Output case, the Output Device is left a static location and is connected to by Wi-Fi. Even in this case it is possible to determine a coarse location based on its IP address, which can be decoded and traced to provide geographic context. Finally the Location could be entered as part of the Device Setup. Wi-Fi zone connections could prompt the user for the location of the zone.

All of this information could be captured and stored by the System as additional Informational Assets that would be used for the purposes of business utilization and enhancing the user experience, as has already been discussed.

The state of consumables can allow the user to manage their output devices as they use them. When the user has more than one device, they can manage the state of each device.

In some cases, a user might be given access the state of devices belonging to their followers. For example, they may have given their grandmother a printer and set it up for her. They may wish to keep an eye on it and help her manage its use. For example, if they saw that her media supply was low, they could order more media for her or go over and help her load in new media.

As already discussed, the Output Device status can be used to warn the user when battery power or media is running low. It can be a necessary part for building Media Management capability.

But it could also be used to provide a marketing service. For example, such a service could identify those users whose media supply was running low for third party concerns so that branded media offers could be made to those users.

There may also be occasions when location information might be useful from the user and the Social Network point of view. A user might allow the location of the Output Device to be "Findable" to either the members of their network, or to anyone that is interested. This would allow a user to know if a Follower has their Output Device with them, or whether they have left it home. If a gathering of friends was planned, this might be useful to ensure that at least one Output Device was brought to their gathering in order to handle Instant Print Requests. It also might be handy to see if one of your friends is nearby if you wanted to make a print quickly and did not have your printer with you.

12.0 Development of Informational Assets

Informational Assets are cultivated on each of the primary elements of the system. This information is created in several ways.

12.1 Capture of Informational Assets

One way is by user assertion. In this case, the user explicitly provides information to the System during setup and account creation or when they edit or enhance their user profile. They can also provide explicit information through their use of the system. For example, when sharing an image they may add a caption to that image, or add a comment. Automatic Social Posting may also have associated comments. These bits of information are asserted by the user and captured by the Smart Application Device. This information is then transferred to the Cloud Service where it is stored within the user's information Database.

Another way that information is captured is by observation. Here, information is cultivated by the behavior of the system, or the behavior of the user. In each case, there is some form of software instrumentation that collects key pieces of information and stores them in a Database. Examples of the System behavior is tracking things like lag time, exception codes, measures of resource contention, etc. Such software instrumentation can also track the behavior of the user, such as Personal Prints made, Prints from followers made, images shared with followers, connections used for printing, media and hardware purchases, etc. This can extend to how often the user access various screens or controls other Smart Personal Device application.

The instrumentation can take the form of a simple count of how many times a particular action occurs. It might also consist of a log that tracks the time, location, and nature of each event. Such a log can then be processed at a later time to calculate summary statistics. It can also be data mined in a free form way to answer more specific questions. Such information can also be collected and analyzed by industry standard cloud tools such as Google Analytics or Flurry or by propriety methods build into the system.

Print event metadata is also a rich source for cultivation.

Data can be collected where it is created, either in the Smart Personal Device, the Output Device, or the Cloud. Ultimately the data must migrate to the Cloud and be stored in a way that allow both aggregate and individual user analysis. This storage can be ongoing, which implies that the amount of data collected over time is constantly increasing. In some cases it can be stored as a rolling buffer, where data is stored for the last N months. In other cases, the data can be stored and periodically analyzed and summarized. In this case the summaries may be for an extended period, but the raw data is periodically purged from the system.

12.2 Media Management

With today's printing paradigm, it is not uncommon for user to print something only to find that the printer reports that is out of paper, or perhaps one of the ink cartridges is empty. This causes the user to attempt to reload the printer with the needed supply. This, of course, assumes that they have additional paper or ink cartridges to load. All too often a user is caught short without a backup supply of paper or ink or some other consumable.

With the current invention, the System tracks the state of Output Systems consumables very carefully. In addition to this, the System promotes the ordering of consumables for the output system. The user is encouraged to purchase consumables through the System by offering discounts that scale based on user-driven media consumption. Besides the cost and order convenience advantages within system purchases, another attraction is having a system that manages your media supplies for you. The System knows what supplies you have purchased, and it knows what the current state of consumables is within the Output Device. Monitoring both of these allows the system to warn the user when their supplies are getting low or when the supplies have become critical. It can simplify the reordering process. In some cases the user may empower the system to automatically order new supplies such that they never have to worry about running out.

12.3 Customer Relationship Management

The current embodiment of the system provides the building blocks for advanced Customer Relationship Management. First we provide a platform for users to drive socially networked print experiences within the System, and social media interaction outside of the system. This framework allows the system to cultivate a rich set of information about the user, their behaviors and their network contacts. This information is extremely useful when developing and marketing new products, accessories, consumables, and services.

It also provides the opportunity to entice desired behaviors. Typically the behaviors desired center on encouraging media burn and promoting device sales. Loyalty programs can be centered around metrics that focus on these issues. High scores can be given to a user that drives printing: both personal printing and printing due to sharing images with your followers. Direct and Indirect printing can be tracked and used to compute a ranking or score. This can be used to provide scaled or progressive discounts for future purchases, or to reward users with free consumables. This ranking could also be overtly promoted within the network itself—added as part of the user's profile. This tends to given the user recognition of their "influence" in the network, and can become a reward or emotional payoff for their social network behaviors.

Similar measures might be adopted around a user's ability to bring others into the network. Keeping track of the number of invites sent to those outside the system who then subsequently joined the system could also be used to increase status and to earn awards, prizes, or discounts. Keeping track of user that joined and then subsequently purchased Output Hardware could also be done.

Users that join the system but have not yet purchased and registered Output Devices could also be targeted for special marketing campaigns.

Media Management mechanisms could be combined with Customer Relationship Management practices to lock in the user and generate high switching costs.

13.0 Support of Alternative Business Models

The traditional business model around output devices consist of the sales of the devices and media used by the devices. This model will also work for the current invention. However, alternative business models can be supported as well.

13.1 Free Output Devices Subsidized by Media Sales

With this model, the Output Devices are given away for free or some very low token price and the revenue are made on media sales. The goal is to generate network scale quickly by taking away the purchase price as a barrier to entry for the user. An alternative arrangement would have a printer come free with a bulk purchase of a certain amount of media. Another version of this model is similar to the cell phone model: for a monthly charge rate and time period of commitment, the user gets a printer and a certain amount of media each month. Should the user want more media in a given month, they may order it at a price fixed by the plan.

13.2 Free Prints Supported by Advertising Plays

The idea behind this model is that the user buys the printer, and has the opportunity make prints in two ways. The first way is to just buy media and make prints whenever they want. This is identical to the traditional business model. In the second way of printing, the user signs up for a special program that provides for "Free Prints". This model is subsidized by advertising revenue. In the preferred embodiment, this model would leverage a roll-fed output device that was capable of creating variable aspect ratio output.

For those signed up with this program, all prints are made extending the size of output in the long dimension. This would create output that displayed the entire image area, but would also have an extended region adjacent to the image where an ad could be printed. The media used would be shipped to the user upon sign-up for the free print service. This paper would have a special bar code printed on the back side that would be detected by the printer. This bar code might be visible to the user, but another option is to use an IR barcode that would be detected by the printer but not by the user. The printer would only print on this paper when the user was signed up for the free program that required that ads would be printed, thus ensuring the media was dedicated to advertisement-based printing. A new roll of media would automatically be sent to the user when the system detected that the supply was getting low.

The ad would be selected from a group of possible ads based on a smart rule-based system that would evaluate User Profile and available Informational Assets data for a given user, and choose the ad that is most likely to resonate with the user. Advertisers would pay a fee to have ads placed in this fashion, and this would constitute the primary revenue of this business model. Advertisers would have excellent ad placement with a highly targeted audience segment based on unique informational resources cultivated by the network.

This scheme has been tried before, with free photographic prints ordered through the internet and shipped to the user's home. With this approach, ads were printed on the back of the prints. This form of offering had some real disadvantages. The colorfulness of an ad printed on the pack of the print is often limited because of the nature of print media. Often they are only in black and white. The other disadvantage is the ads are not very prominent. Prints are usually stacked image side up—when stored and used in this fashion the ads are not visible. Often prints are put in picture frames or mounted in photo albums. Again, in both cases, the ads would not be visible or even accessible once mounted.

The method used in the current embodiment is superior to this in that the ads are visible any time the image is visible, thus being more prominent. Users may choose to cut the ad off from the side of the print, resulting with a normal image with no ad visible. This is not a disadvantage. During the cutting process the user is keenly presented with the content of the ad. Once cut from the print, the ad is still visible and useful. For example, the ad could be a bar-coded discount coupon, and once removed from the print, they still have a useful life as standalone coupon or business card.

This would result in a superior experience for both the advertiser and the consumer (who would voluntarily opt in). The System would be able to enforce the printing of ads to enable free prints, and would leverage unique informational assets regarding the user in order to have high precision micro-targeting of ad content.

Computer Implementation Details

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Various processing steps involved in implementing methods according to an embodiment may be carried out on a single processing device (comprising a programmable processor and an associated memory containing instructions and data), or the steps may be split among two or more cooperating processing devices (each having its own programmable processor and associated memory). In the latter case, the processors may coordinate their activities via wired or wireless data communication, but each processor and its associated, directly-connected memory are physically separated from the others (i.e., a first processor has no direct connection to a second processor's memory).

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that personal, portable and socially-networked printing can also be accomplished by software and hardware that distribute the functions of embodiments of this invention differently than herein described. Such variations and implementations are understood to be captured according to the following claims.

We claim:

1. A method for producing a plurality of similar keepsakes at distributed locations, comprising:
   receiving an electronic dataset describing features of a keepsake;
   transmitting a first version of the electronic dataset to a first replicator device at a first location; and
   transmitting a second version of the electronic dataset to a second replicator device at a second location remote from the first location, wherein
   the first replicator device is to construct a first keepsake at the first location, and
   the second replicator device is to construct a second keepsake at the second location,
   said first and second keepsakes being substantially similar.

2. The method of claim 1 wherein the second version of the electronic dataset is different from the first version of the electronic dataset.

3. The method of claim 2 wherein a resolution of the first version of the electronic dataset is different from a resolution of the second version of the electronic dataset.

4. The method of claim 1 wherein a resolution of the first replicator device is different from a resolution of the second replicator device.

5. The method of claim 1 wherein a resolution of the first replicator device is lower than a resolution of the first version of the electronic dataset.

6. The method of claim 5 wherein a resolution of the second replicator device is lower than a resolution of the second version of the electronic dataset.

7. A replicator comprising:
   a data communication interface;
   a programmable processor coupled to the data communication interface;
   a first memory to store instructions and data to control operations of the programmable processor;
   a second memory to store a data representation of a keepsake, and
   a fabrication mechanism having an effective resolution, wherein the instructions and data in the first memory cause the replicator to perform actions comprising:

subscribing to a plurality of data feeds;
receiving data from a first data feed over the data communication interface;
storing the data from the first data feed in the second memory;
checking a permission of the first data feed; and
if the permission of the first data feed check succeeds, causing the fabrication mechanism to construct a keepsake based on the data from the first data feed.

8. The replicator of claim 7, wherein the instructions and data in the first memory cause the replicator to perform further actions comprising:
receiving data from a second data feed over the data communication interface;
storing the data from the second data feed in the second memory;
checking a permission of the second data feed; and
if the permission of the second data feed check fails, discarding the data from the second data feed.

9. The replicator of claim 7 wherein the second memory is a volatile memory.

10. The replicator of claim 7, wherein the instructions and data in the first memory cause the replicator to perform further actions comprising:
discarding the data from the first data feed after the keepsake is constructed by the fabrication mechanism.

11. A printed object comprising:
a physical object created from a digital data stream produced through an irreversible process so that the digital data stream cannot be identically recovered from the physical object, wherein the physical object includes:
a first feature representing metadata collected at a time of construction of the digital data stream; and
a second feature representing metadata collected at a time of creation of the physical object, wherein
said time of construction and time of creation are different.

12. The printed object of claim 11 wherein
the physical object created from the digital data stream is a print of a digital photograph,
the first feature representing metadata is a human-readable message on the print of a date at which the digital photograph was taken, and
the second feature representing metadata is a human-readable message on the print of a location at which the physical object was printed.

13. The printed object of claim 11 wherein
physical object created from the digital data stream is a print of a digital photograph, and
the second feature representing metadata is a machine-readable mark on the print of a location at which the physical object was printed.

14. The printed object of claim 11 wherein
the second feature representing metadata is a machine-readable mark on the physical object, said machine-readable mark to cause a web browser program to retrieve information associated with the physical object from an online electronic data source.

15. A method for producing a plurality of similar keepsakes at distributed locations, comprising:
registering an identity of a producer of a plurality electronic datasets;
recording a plurality of subscribers to the plurality of electronic data sets;
receiving a first electronic dataset of the plurality of electronic datasets from the producer;
transmitting the first electronic dataset to a first subscriber of the plurality of subscribers; and
transmitting the first electronic dataset to a second, different subscriber of the plurality of subscribers, wherein
a first replicator device of the first subscriber and a second replicator device of the second subscriber manufacture first and second keepsakes, respectively, each keepsake based on the first electronic dataset, the first and second artifacts being substantially similar.

16. The method of claim 15 wherein the registering operation precedes all of the recording, receiving and the transmitting operations.

17. The method of claim 15 wherein the first electronic dataset describes a graphic image.

18. The method of claim 15 wherein the first electronic dataset describes a three-dimensional object.

19. The method of claim 15 wherein the first replicator device is a battery-operated color printer.

20. The method of claim 15 wherein the first replicator device is a three-dimensional printer.

21. The method of claim 15, further comprising:
notifying the first subscriber after the first electronic dataset is transmitted to the first subscriber; and
obtaining confirmation from the first subscriber before the first replicator device of the first subscriber begins the manufacturing operation.

22. The method of claim 15, further comprising:
altering the first electronic dataset after the receiving operation and before at least one transmitting operation to create an altered first electronic dataset; and
transmitting the altered first electronic dataset to a third subscriber of the plurality of subscribers, wherein
a third replicator device of the third subscriber manufactures a third keepsake based on the altered first electronic dataset, said third keepsake being substantially similar to the first keepsake and the second keepsake.

23. The method of claim 22 wherein altering comprises reducing a resolution of the first electronic dataset.

24. The method of claim 22, further comprising:
receiving capability information of the third replicator device, wherein
the altering operation alters the first electronic dataset in view of the capability information of the third replicator device.

25. The method of claim 22, further comprising:
receiving preference information from the third subscriber, wherein
the altering operation alters the first electronic dataset in view of the preference information of the third subscriber.

26. The method of claim 22, further comprising:
receiving a completion message from one of the plurality of subscribers after a replicator device of the one of the plurality of subscribers finishes a manufacturing operation.

27. A method for creating selected keepsakes comprising:
transmitting a request to receive digital datasets describing keepsakes to a cloud-based server;
receiving a first digital dataset from a sender as a result of transmitting the request; and
fabricating a keepsake based on the first digital dataset.

28. The method of claim 27 wherein the cloud-based server is the same as the sender.

29. The method of claim 27 wherein the cloud-based server is different from the sender.

30. The method of claim 27 wherein the request comprises:
a selector to prospectively identify desired digital datasets among a larger plurality of datasets.

31. The method of claim 27 wherein the request comprises:
a capability indicator to identify a desired resolution of the digital datasets describing keepsakes.

32. The method of claim 27 wherein the request comprises:
an address for receiving the digital datasets, wherein the address contains information for the sender to communicate with a keepsake replicator.

33. The method of claim 27, further comprising:
transmitting a completion message after the fabricating operation.

* * * * *